US012801069B2

(12) United States Patent
Ishifuji et al.

(10) Patent No.: US 12,801,069 B2
(45) Date of Patent: Nov. 17, 2026

(54) FIXING ROTATOR, THERMAL FIXING DEVICE, AND ELECTROPHOTOGRAPHIC IMAGE FORMING APPARATUS

(71) Applicant: CANON KABUSHIKI KAISHA, Tokyo (JP)

(72) Inventors: Ryo Ishifuji, Ibaraki (JP); Yasuhiro Miyahara, Tokyo (JP); Hiroki Muramatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 19/212,903

(22) Filed: May 20, 2025

(65) Prior Publication Data

US 2025/0362631 A1 Nov. 27, 2025

(30) Foreign Application Priority Data

May 27, 2024 (JP) ................................ 2024-085643

(51) Int. Cl.
*G03G 15/20* (2006.01)

(52) U.S. Cl.
CPC ....... *G03G 15/2057* (2013.01); *G03G 15/206* (2013.01); *G03G 15/2064* (2013.01)

(58) Field of Classification Search
CPC ............ G03G 15/2057; G03G 15/206; G03G 15/2064
See application file for complete search history.

(56) References Cited

U.S. PATENT DOCUMENTS

| | | | |
|---|---|---|---|
| 6,219,522 B1 | 4/2001 | Ishizuka et al. | |
| 7,212,771 B2 | 5/2007 | Tanaka et al. | |
| 9,715,202 B2 | 7/2017 | Maeda | |
| 10,712,697 B2 | 7/2020 | Maeda et al. | |
| 10,859,955 B2 | 12/2020 | Asaka et al. | |
| 2009/0197030 A1 | 8/2009 | Mukai et al. | |
| 2011/0236691 A1 | 9/2011 | Fukumoto et al. | |
| 2012/0315068 A1 | 12/2012 | Fukumoto et al. | |
| 2017/0097597 A1 | 4/2017 | Maeda | |
| 2017/0277090 A1* | 9/2017 | Mukoyama ........ | G03G 15/2057 |
| 2019/0377291 A1 | 12/2019 | Maeda et al. | |
| 2022/0206419 A1* | 6/2022 | Muramatsu ........ | G03G 15/2057 |

FOREIGN PATENT DOCUMENTS

| | | |
|---|---|---|
| JP | 2000-155489 A | 6/2000 |
| JP | 2005-338797 A | 12/2005 |
| JP | 2008-200954 A | 9/2008 |
| JP | 2009-186617 A | 8/2009 |
| JP | 4410918 B2 | 2/2010 |
| JP | 2020-106561 A | 7/2020 |

OTHER PUBLICATIONS

Extended European Search Report in European Application No. 25178720.6 (Oct. 2025).

* cited by examiner

*Primary Examiner* — Sandra Brase
(74) *Attorney, Agent, or Firm* — Venable LLP

(57) ABSTRACT

A fixing rotator including an endless shaped base layer, an elastic layer at an outer peripheral surface side of the base layer, and a surface layer fixed to an outer peripheral surface side of the elastic layer via an adhesive layer, wherein an internal stress B of a sample taken from the surface layer, as represented by a specific formula, is −3.0% or less.

10 Claims, 9 Drawing Sheets

| | |
|---|---|
| (1) | 0. 312±0. 03(mm) |
| (2) | 0. 071±0. 03(mm) |
| (3) | 45±1(° ) |
| (4) | 0. 1±0. 03(mm) |
| (5) | 6. 9±0. 1(mm) |
| (6) | 1. 5±0. 1(mm) |

FIXING ROTATOR, THERMAL FIXING DEVICE, AND ELECTROPHOTOGRAPHIC IMAGE FORMING APPARATUS

BACKGROUND

Field of the Technology

The present disclosure relates to a fixing rotator used in an electrophotographic image forming apparatus, a thermal fixing device, and an electrophotographic image forming apparatus.

Description of the Related Art

As a fixing rotator used in a thermal fixing device of an electrophotographic image forming apparatus (hereinafter, also referred to as an "image forming apparatus") such as a printer, a copy machine, or a facsimile, there is a belt-shaped or roller-shaped fixing rotator. For example, a fixing rotator is known, in which an elastic layer made of heat-resistant rubber or the like is formed, as necessary, on a belt or a roller-shaped substrate made of heat-resistant resin or metal, and in which a fluororesin having excellent mold releasability with respect to toner is contained in a surface layer. Here, as the fluororesin contained in the surface layer, a tetrafluoroethylene-perfluoroalkyl vinyl ether copolymer (PFA) having excellent heat resistance is preferably used.

In recent years, from the viewpoint of environmental response, it has been required to reduce waste by prolonging the service life of the fixing rotator. In the material used for the fixing rotator, there is "surface layer wrinkling" as a problematic phenomenon to be overcome for a longer service life. This is because when the fixing rotator is used for a long period of time, a heating cycle of increase and decrease in the temperature of the member is repeated, and thus the strength of the material of the surface layer gradually decreases.

For example, in a case where a tube material made of fluororesin is used as a surface layer of the fixing rotator, the fluororesin tube covers the surface of the fixing rotator in a state of being firmly stretched at the beginning of manufacture. However, the thermal expansion and shrinkage of the tube material are repeated according to repetition of the heat cycle, and the tension of the fluororesin tube gradually loosens. As the looseness increases, "wrinkling" occurs on the surface layer of the fixing rotator. When wrinkling progresses to a toner image area, an image defect, in which a wrinkling trace is transferred onto a toner image after fixing, occurs, and replacement of the fixing rotator is required.

As a method for solving this problem, for example, Japanese Patent Laid-Open No. 2008-200954, Japanese Patent Laid-Open No. 2020-106561, and Japanese Patent Laid-Open No. 2009-186617 disclose processing of imparting, in advance, thermal shrinkage to a fluororesin tube used for a fixing rotator. By imparting thermal shrinkage, the linear expansion rate at the time of heating decreases. That is, since the thermal expansion and shrinkage amount at the time of the heating cycle are reduced, the looseness of the tension of the surface layer can be reduced, and the occurrence of wrinkling can be curbed.

SUMMARY

However, the present inventors have found that the inventions described in Japanese Patent Laid-Open No. 2008-200954, Japanese Patent Laid-Open No. 2020-106561, and Japanese Patent Laid-Open No. 2009-186617 have the following problems.

In a method of imparting thermal shrinkage to a fluororesin tube manufactured by extrusion molding, a method of imparting thermal shrinkage after extrusion is often used, and the manufacturing cost increases because the number of tube manufacturing processes increases. In addition, since only a fluororesin material to which thermal shrinkage can be imparted can be used, selection of a material is restricted.

In addition, in a case where a fluororesin tube to which thermal shrinkage has been imparted is used, the tube is thermally shrunk at the time of manufacturing, thereby tightening an elastic layer, and thus the apparent hardness of the fixing rotator increases. Therefore, the followability of the fixing rotator to the unevenness of the medium is deteriorated, and gloss unevenness may occur.

In addition, in order to curb "surface layer wrinkling," it is also useful to increase the linear expansion rate on the elastic layer side at the actual use temperature and apply tension on the surface layer side. In order to increase the linear expansion rate of the elastic layer, it is useful to reduce the amount of heat transfer filler in the rubber of the elastic layer as much as possible, but in this case, the heat conductivity of the elastic layer may be impaired, and the fixability may be deteriorated.

At least one aspect of the present disclosure is directed to providing a fixing rotator capable of curbing the occurrence of wrinkling even when used for a long period of time without causing restrictions on material selection, occurrence of gloss unevenness, and the like.

Further, at least one aspect of the present disclosure is directed to providing a thermal fixing device including the fixing rotator.

Further, the present disclosure is directed to providing an electrophotographic image forming apparatus including the thermal fixing device.

The present disclosure relates to a fixing rotator, comprising:

an endless shaped base layer;

an elastic layer at an outer peripheral surface side of the base layer; and a surface layer fixed to an outer peripheral surface side of the elastic layer via an adhesive layer, wherein when a length $L1s$ of a measurement sample sampled from the surface layer in a rotation axis direction of the fixing rotator at 25 °C is measured, and a length $L2s$ of the measurement sample when a temperature is raised from a temperature of 25 °C to 250 °C at a temperature raising rate of 10 °C/min, then held for 5 minutes while the measurement sample is pulled in the rotation axis direction of the fixing rotator with a load of 25 mN, and subsequently the temperature is lowered from the temperature of 250 °C to 25 °C at a temperature lowering rate of 10 °C/min is measured, an internal stress B represented by formula (i) below is not more than −3.0:

$$B(\%) = (L2s - L1s)/L1s \times 100. \quad \text{(i)}$$

Features of the present disclosure will become apparent from the following description of embodiments with reference to the attached drawings. The following description of embodiments are described by way of example.

DESCRIPTION OF THE EMBODIMENTS

Figure 1:
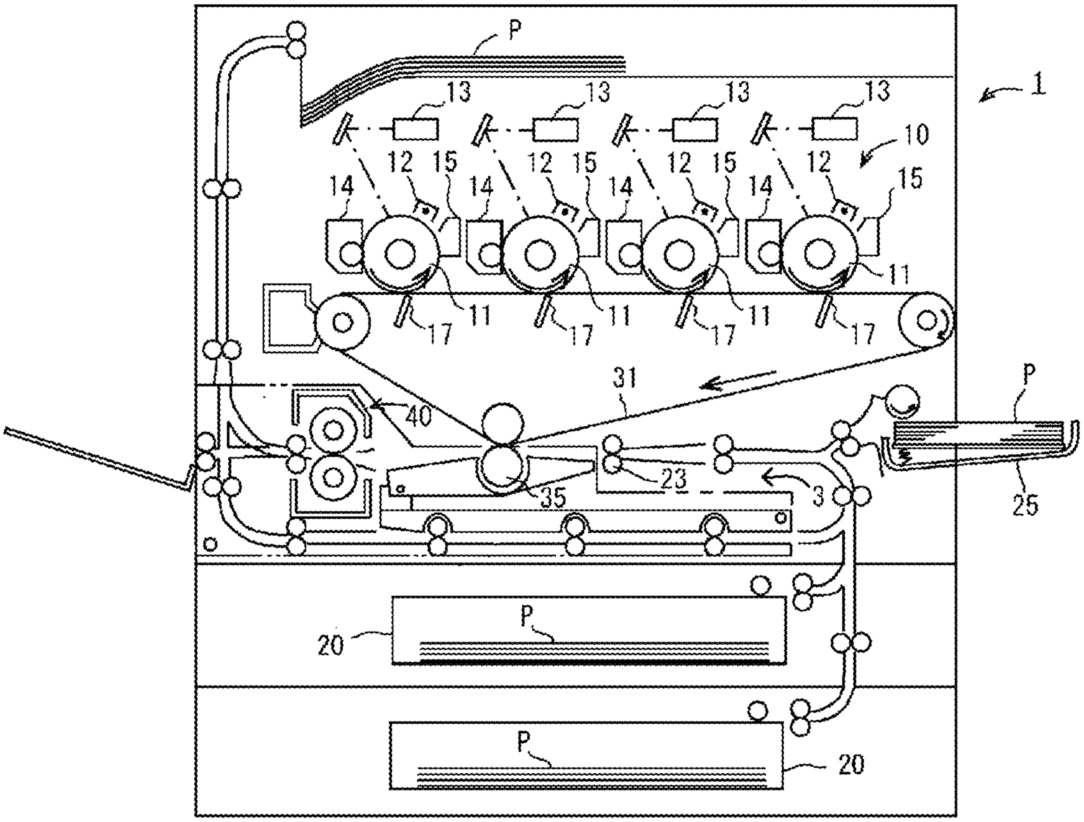
FIG. 1 is a schematic cross-sectional view of an example of an image forming apparatus.

Unless otherwise specified, descriptions of numerical ranges such as "from XX to YY" or "XX to YY" in the present disclosure include the numbers at the upper and lower limits of the range. When numerical ranges are described in stages, the upper and lower limits of each of each numerical range may be combined arbitrarily. In the present disclosure, wording such as "at least one selected from the group consisting of XX, YY and ZZ" means any of: XX; YY; ZZ; a combination of XX and YY; a combination of XX and ZZ; a combination of YY and ZZ; or a combination of XX and YY and ZZ.

Hereinafter, specific examples (examples) of embodiments of the present disclosure will be described with reference to the drawings, but the present disclosure is not limited to the following examples.

The reference numerals in the drawings are as follows.

10: Image forming unit, 11: Photosensitive drum, 12: Charger, 13: Laser scanner, 14: Developing device, 15: Cleaner, 17: Primary transfer blade, 20: Sheet feeding cassette, 25: Multi-feed tray, 23: Registration roller pair, 31: Intermediate transfer belt, 35: Secondary transfer roller, 40: Fixing device, 41: Fixing belt 41*a*: Surface layer, 41*b*: Base layer, 41*c*: Elastic layer, 41*d*: Inner surface layer, 43: Heating body, 44: Pressure roller, 45: Contact thermistor, 46: Heater holder

101: Core, 200: Corona charger, 201: Front block, 202: Back block

203, 204: Shield, 205: Discharge wire, 206: Grid

401-1: First cross section, 401-2: Second cross section

P: Sheet, T: Toner image

FIG. 1 is a schematic cross-sectional view of a color electrophotographic printer that is an example of an image forming apparatus including a fixing rotator according to an embodiment of the present disclosure, and is a cross-sectional view along a sheet conveyance direction. Hereinafter, in the present specification, the color electrophotographic printer is simply referred to as a "printer."

A printer 1 shown in FIG. 1 includes an image forming unit 10 of colors of yellow (Y), magenta (M), cyan (C), and black (Bk). A photosensitive drum 11 is charged in advance by a charger 12. Thereafter, a latent image is formed on the photosensitive drum 11 by a laser scanner 13. The latent image becomes a toner image by the developing device 14. The toner image on the photosensitive drum 11 is sequentially transferred to, for example, an intermediate transfer belt 31, which is an image carrier, by a primary transfer blade 17. After the transfer, the toner remaining on the photosensitive drum 11 is removed by a cleaner 15. As a result, the surface of the photosensitive drum 11 becomes clean to prepare for the next image formation.

On the other hand, sheets P are sent one by one in the direction of the arrow 3 from a sheet feeding cassette 20 or a multi-feed tray 25, and are sent to a registration roller pair 23. The registration roller pair 23 temporarily receives the sheets P and straightens the sheets P when the sheets are skewed. Then, the registration roller pair 23 sends the sheets between the intermediate transfer belt 31 and a secondary transfer roller 35 in synchronization with the toner image on the intermediate transfer belt 31. The color toner image on the intermediate transfer belt is transferred to the sheet P by, for example, the secondary transfer roller 35 which is a transfer body. Thereafter, the toner image on the sheet P is fixed to the sheet by heating and pressurizing the sheet P by the fixing device 40.

Figure 2:
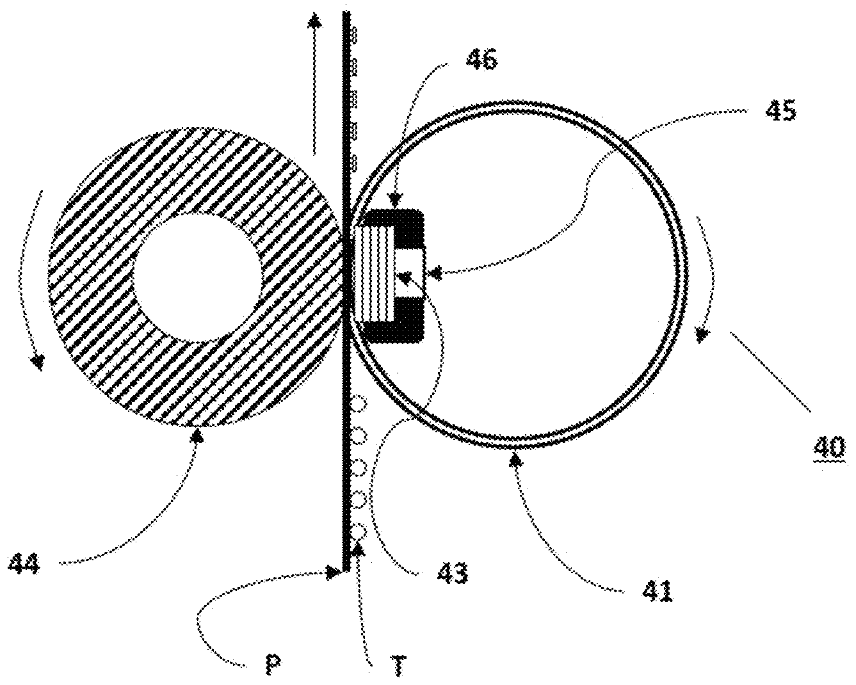
FIG. 2 is a schematic cross-sectional view showing a configuration of a fixing device.

Next, a thermal fixing device according to the present disclosure will be described. A thermal fixing device according to the present disclosure includes a heating member that is a fixing rotator according to the present disclosure, and a pressure member disposed opposite to the heating member. FIG. 2 is a schematic cross-sectional view of a fixing device 40 that is an example of the thermal fixing device according to the present disclosure. The fixing device 40 in FIG. 2 is a belt heating type heating device (tensionless type).

The fixing device 40 includes a ceramic heater 43 (hereinafter, referred to as a heater) as a heating element. The heater 43 includes an elongated thin plate-shaped ceramic substrate having a longitudinal direction perpendicular to the figure, and a conductive heating resistor layer provided on the substrate surface as basic components. The heater 43 is a low-heat-capacity heater that rises in temperature with a steep rising characteristic as a whole when electricity is applied to the heating resistor layer.

Figure 3:
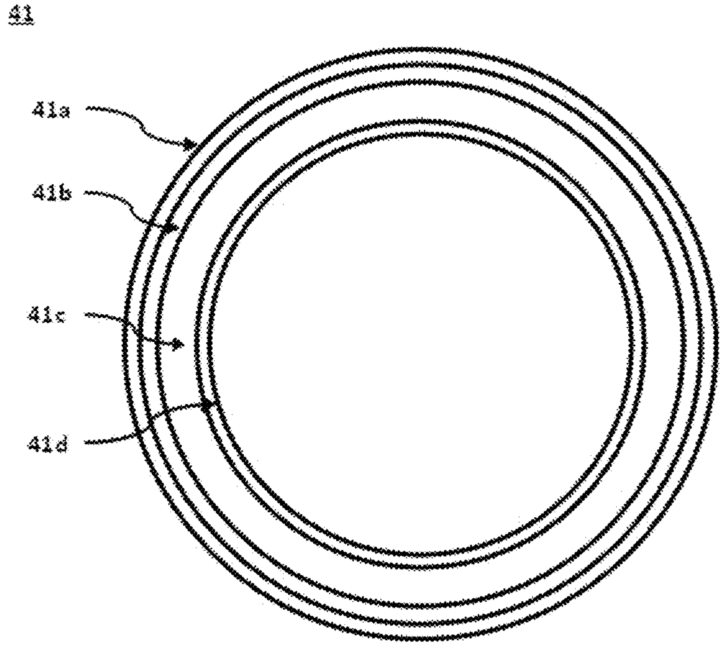
FIG. 3 is a schematic cross-sectional view of a fixing belt.

The fixing rotator according to the present disclosure can be used as, for example, a heating member. One aspect of the fixing rotator according to the present disclosure is a fixing belt having an endless belt shape. The fixing belt 41 is a cylindrical (endless) heat-resistant fixing belt as a heating member that transfers heat, and is loosely fitted on a support member (heater holder) 46 including the heater 43. The fixing belt 41 according to an aspect of the present disclosure is as shown in FIG. 3, and is a fixing belt having a composite structure of at least a surface layer 41*a*, an elastic layer 41*c*, and a base layer 41*d*.

A pressure roller 44 is a heat resistant elastic pressure roller as a pressure member, and includes a core metal and an elastic layer made of heat resistant rubber such as silicone rubber or fluororubber, or a silicone rubber foam. Both end portions of the core metal are rotatably supported by bearings.

The fixing belt 41 and the heater 43 are disposed above the pressure roller 44 in parallel to the pressure roller 44 and pressed by a pressing member (not illustrated). In this manner, the lower surface of the heater 43 and the upper surface of the pressure roller 44 are pressed against the elasticity of the elastic layer via the fixing belt 41 to form a fixing nip portion having a predetermined width as a heating portion.

The pressure roller 44 is rotationally driven at a predetermined rotational peripheral speed in a counterclockwise direction indicated by an arrow by a driving means (not illustrated). A rotational force acts on the cylindrical fixing belt 41 due to a pressure friction force at the fixing nip portion between the pressure roller 44 and the fixing belt 41 according to rotational driving of the pressure roller 44. Then, the fixing belt 41 comes into a driven rotation state in a clockwise direction indicated by an arrow while sliding in close contact with the downward surface of the heater 43. The support member (heater holder) 46 is also a rotation guide member of the cylindrical fixing belt 41.

The pressure roller 44 is rotationally driven, and accordingly, the cylindrical fixing belt 41 is in a driven rotation state, electricity is applied to the heater 43 to cause the temperature of the heater to rapidly rise to a predetermined temperature, and the temperature of the heater is adjusted. In such a state, the sheet P carrying an unfixed toner image T is introduced between the fixing belt 41 of the fixing nip portion and the pressure roller 44. Then, in the fixing nip portion, the toner image bearing side surface of the sheet P comes into close contact with the outer surface of the fixing belt 41 and is nipped and conveyed to the fixing nip portion together with the fixing belt 41. In this nipping and conveying process, the sheet P is heated by the heat of the fixing belt 41 heated by the heater 43, and the unfixed toner image T on the sheet P is heated and pressurized on the sheet P and melted and fixed. The sheet P having passed through the fixing nip portion is curvature-separated from the surface of the fixing belt 41 and discharged and conveyed.

A contact thermometer (thermistor) 45 is configured to measure the temperature of the fixing belt 41 heated by the heater 43 and pass a detection result to a temperature control means (not illustrated).

The heater holder 46 is a member that holds the heater 43 that has generated heat to a high temperature.

Next, the fixing belt will be described in detail.

The fixing belt of the present disclosure includes a base layer 41*d* having an endless shape, an elastic layer 41*c* provided on the outer peripheral surface side of the base layer, and a surface layer 41*a* on the outer peripheral surface side of the elastic layer 41*c*.

An example of the fixing belt according to the present disclosure is as shown in FIG. 3. The fixing belt 41 includes the base layer 41*d*, the elastic layer 41*c* covering the outer surface of the base layer 41*d*, and the surface layer 41*a* covering a surface of the elastic layer on a side opposite to a side facing the base layer. The fixing belt 41 may have a resin layer 41*b* that is an adhesive layer on a surface of the elastic layer 41*c* on the side opposite to the side facing the base layer.

(1) Base Layer

The material of the base layer 41*d* is not particularly limited, and a known material used as a base layer of a fixing rotator such as a fixing belt can be adopted. For example, metals and alloys such as aluminum, iron, stainless steel, and nickel, and heat-resistant resins such as polyimide are used. The base layer preferably contains at least one selected from the group consisting of nickel, copper, iron, and aluminum, and more preferably contains stainless steel. The thickness of the base layer 41*d* is not particularly limited, and is preferably from 20 μm to 100 μm, and more preferably from 20 μm to 50 μm, for example, from the viewpoint of strength, flexibility, and heat capacity.

The outer surface of the base layer 41*d* may be subjected to surface treatment in order to impart adhesiveness with the elastic layer. For the surface treatment, it is possible to use one or a combination of a plurality of physical treatments such as blast treatment, lapping treatment, and polishing, and chemical treatments such as oxidation treatment, coupling agent treatment, and primer treatment.

The surface of the base layer 41*d* is preferably subjected to primer treatment in order to improve adhesiveness between the base layer and the elastic layer. Examples of the primer used for the primer treatment include a coating material in which a colorant such as a silane coupling agent, a silicone polymer, methylsiloxane hydride, alkoxysilane, a reaction promotion catalyst, or red iron oxide is appropriately blended and dispersed in an organic solvent.

The primer can be appropriately selected depending on the material of the base layer, the type of the elastic layer, or the form of crosslinking reaction. In particular, when the elastic layer contains a large amount of unsaturated aliphatic groups, a primer containing a hydrosilyl group is suitably used in order to impart adhesiveness by reaction with the unsaturated aliphatic groups. When the elastic layer contains a large amount of hydrosilyl groups, a primer containing an unsaturated aliphatic group is suitably used.

Other examples of the primer include a primer containing an alkoxy group. As the primer, a commercially available product can be used. Further, primer treatment includes a process of applying the primer to the outer surface of the base layer (the surface bonded to the elastic layer), and drying or firing the primer.

(2) Elastic Layer

The elastic layer is a layer for imparting flexibility to the fixing rotator in order to secure the fixing nip in the thermal fixing device. When the fixing rotator is used as a heating member in contact with the toner on the paper, the elastic layer also functions as a layer for imparting flexibility such that the surface of the heating member can follow the unevenness of the paper.

A known material can be used for the elastic layer, and the material is not particularly limited, but preferably includes rubber as a matrix and thermally conductive filler dispersed in the rubber. More specifically, the elastic layer contains rubber and thermally conductive filler, and is preferably composed of a cured product obtained by curing a composition containing at least a raw material of rubber (base polymer, crosslinking agent, etc.) and thermally conductive filler. In particular, the elastic layer preferably contains silicone rubber.

The rubber is preferably silicone rubber. A composition containing at least a raw material of rubber (base polymer, crosslinking agent, etc.) and thermally conductive filler is hereinafter also referred to as a silicone rubber composition. When the silicone rubber composition is in a liquid form, the thermally conductive filler is easily dispersed, and the elasticity of the elastic layer to be produced is easily adjusted by adjusting the degree of crosslinking according to the type and addition amount of the thermally conductive filler.

The matrix has a function of exhibiting elasticity in the elastic layer. The matrix preferably contains the silicone rubber from the viewpoint of exhibiting the function of the elastic layer described above. The silicone rubber has high heat resistance capable of maintaining flexibility even in an environment of a high temperature of about 240 °C in a non-sheet passing portion region, which is preferable.

The elastic layer can be formed, for example, by coating an addition-curable liquid silicone rubber on the outer surface of the base layer and heating and curing the same. The coating method is not particularly limited, and a known method may be used.

The thickness of the elastic layer can be appropriately designed in consideration of the surface hardness of the fixing rotator and the width of the fixing nip portion to be formed, and is preferably from 100 μm to 500 μm, and more preferably from 200 μm to 400 μm.

As the silicone rubber, for example, a cured product of an addition-curable liquid silicone rubber composition which will be described later can be used. The elastic layer can be formed by applying and heating a liquid silicone rubber mixture by a known method.

The liquid silicone rubber composition usually contains the following components (a) to (d).

Component (a): linear organopolysiloxane having unsaturated aliphatic group

Component (b): organopolysiloxane having active hydrogen bonded to silicon

Component (c): catalyst

Component (d): thermally conductive filler

Each component will be described below.

Component (a): Linear Organopolysiloxane Having Unsaturated Aliphatic Group

The linear organopolysiloxane having an unsaturated aliphatic group is an organopolysiloxane having an unsaturated aliphatic group such as a vinyl group, and has a structure in which siloxane bonds are linearly connected. Examples of the linear organopolysiloxane having an unsaturated aliphatic group include at least one selected from the group consisting of a compound represented by the following formula (1) and a compound represented by the following formula (2).

(1)

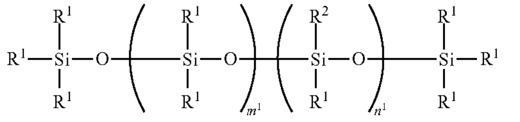

In the formula (1), $m^1$ represents an integer of 0 or more (preferably 500 to 1100), and $n^1$ represents an integer of 3 or more (preferably 10 to 40). In the formula (1), $R^1$ each independently represents a monovalent unsubstituted or substituted hydrocarbon group containing no unsaturated aliphatic group, provided that at least one of $R^1$ represents a methyl group, and $R^2$ each independently represents an unsaturated aliphatic group.

(2)

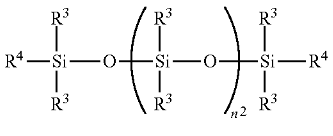

In the formula (2), $n^2$ represents an integer of 1 or more (preferably 500 to 1100), $R^3$ each independently represents a monovalent unsubstituted or substituted hydrocarbon group containing no unsaturated aliphatic group, provided that at least one of $R^3$ represents a methyl group, and $R^4$ each independently represents an unsaturated aliphatic group.

In the formula (1) and the formula (2), examples of the monovalent unsubstituted or substituted hydrocarbon group which can be represented by $R^1$ and $R^3$ and does not contain an unsaturated aliphatic group include the following groups.

Unsubstituted Hydrocarbon Group

Alkyl groups (for example, a methyl group, an ethyl group, a propyl group, a butyl group, a pentyl group, and a hexyl group.).

Aryl groups (for example, phenyl group).

Substituted Hydrocarbon Group

Substituted alkyl groups (for example, a chloromethyl group, a 3-chloropropyl group, a 3,3,3-trifluoropropyl group, a 3-cyanopropyl group, and a 3-methoxypropyl group).

The organopolysiloxane represented by the formula (1) and the formula (2) has at least one methyl group directly bonded to a silicon atom forming a chain structure. From the viewpoint of easy synthesis and handling, it is preferable that 50% or more of each of $R^1$ and $R^3$ be a methyl group, and it is more preferable that all of $R^1$ and $R^3$ be methyl groups.

Further, examples of the unsaturated aliphatic group that can be represented by $R^2$ and $R^4$ in the formula (1) and the formula (2) include the following groups. That is, examples of the unsaturated aliphatic group include a vinyl group, an allyl group, a 3-butenyl group, a 4-pentenyl group, and a 5-hexenyl group. Among these groups, $R^2$ and $R^4$ are each preferably a vinyl group because synthesis and handling are easy and inexpensive, and a crosslinking reaction is easily performed.

As the component (a), from the viewpoint of moldability, the viscosity is preferably from 1000 $mm^2/s$ to 20,000 $mm^2/s$, and more preferably from 3000 $mm^2/s$ to 8000 $mm^2/s$. When it is 1000 $mm^2/s$ or more, it is easy to adjust the hardness required for the elastic layer, and when it is 20,000 $mm^2/s$ or less, it is easy to orient the filler by an electric field. The viscosity (kinematic viscosity) can be measured using a capillary viscometer, a rotational viscometer, or the like on the basis of JIS Z 8803:2011.

The blending amount of the component (a) is preferably 55 vol % or more from the viewpoint of durability and 70 vol % or less from the viewpoint of heat transfer, based on the silicone rubber composition used for forming the elastic layer.

Component (b): Organopolysiloxane Having Active Hydrogen Bonded to Silicon

The organopolysiloxane having active hydrogen bonded to silicon reacts with the unsaturated aliphatic group of the component (a) by the action of a catalyst to function as a crosslinking agent that forms a cured silicone rubber.

As the component (b), any organopolysiloxane having a Si—H bond can be used. In particular, from the viewpoint of reactivity with the unsaturated aliphatic group of the component (a), those in which the number of hydrogen atoms bonded to a silicon atom in one molecule is 3 or more on average are suitably used.

Specific examples of the component (b) include a linear organopolysiloxane represented by the following formula (3) and a cyclic organopolysiloxane represented by the following formula (4).

(3)

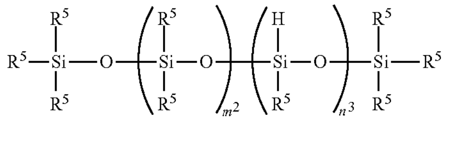

In the formula (3), $m^2$ represents an integer of 0 or more (preferably 10 to 30), $n^3$ represents an integer of 3 or more (preferably 5 to 20), and $R^5$ each independently represents a monovalent unsubstituted or substituted hydrocarbon group containing no unsaturated aliphatic group.

(4)

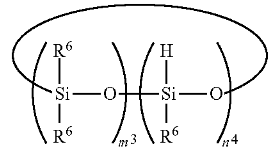

In the formula (4), $m^3$ represents an integer of 0 or more (preferably 10 to 30), $n^4$ represents an integer of 3 or more (preferably 5 to 20), and $R^6$ each independently represents a monovalent unsubstituted or substituted hydrocarbon group containing no unsaturated aliphatic group.

Examples of the monovalent unsubstituted or substituted hydrocarbon group containing no unsaturated aliphatic group that can be represented by $R^5$ and $R^6$ in the formula (3) and the formula (4) include groups same as $R^1$ in the formula (1) described above. Among these, it is preferable that 50% or more of each of $R^5$ and $R^6$ be a methyl group, and it is more preferable that all of $R^5$ and $R^6$ be methyl groups, because synthesis and handling are easy, and excellent heat resistance can be easily obtained.

Component (c): Catalyst

Examples of the catalyst used for forming the silicone rubber include a hydrosilylation catalyst for accelerating a curing reaction. As the hydrosilylation catalyst, for example, a known substance such as a platinum compound or a rhodium compound can be used. The blending amount of the catalyst can be appropriately set, and is not particularly limited.

Component (d): Thermally Conductive Filler

The thermally conductive filler (hereinafter, also simply referred to as filler) is selected in consideration of its own thermal conductivity, specific heat capacity, density, particle size, relative permittivity, and the like. Examples of the thermally conductive filler used for the purpose of improving the heat transfer characteristics of inorganic substances, particularly metals, metal compounds, and the like include the following. Silicon carbide, silicon nitride, boron nitride, aluminum nitride, alumina, zinc oxide, magnesium oxide, silica, copper, aluminum, silver, iron, nickel, metal silicon, carbon fiber.

Furthermore, from the viewpoint of the thermal conductivity, the electric resistance value, and the relative permittivity of the filler itself, at least one filler selected from the group consisting of alumina, zinc oxide, metal silicon, silicon carbide, boron nitride, and magnesium oxide is more preferable. Further, from the viewpoint of the heat resistance of the elastic layer, metal silicon, silicon carbide, or the like having less ionic impurities ($Na^+$ or the like) in the filler is more preferable.

In the fixing rotator according to the present disclosure, the internal stress B of a measurement sample sampled from the surface layer, represented by the formula (i) which will be described later, is-3.0% or less.

The fact that the internal stress B is-3.0% or less is considered to mean that crystallization of the resin constituting the surface layer is sufficiently promoted. Therefore, the linear expansion coefficient of the surface layer decreases, the tension of the surface layer is hardly loosened even if the heat cycle is repeated, and the occurrence of wrinkling can be curbed.

In order to set the internal stress B of the surface layer to −3.0% or less, for example, there is a method in which crystals are grown while heating the surface layer to a temperature equal to or higher than the melting point of the surface layer and pulling the surface layer in the rotation axis direction and the circumferential direction of the fixing rotator to apply the internal stress to the crystal portion of the polymer of the surface layer. As a method of pulling to the surface layer, the surface layer may be mechanically pulled, but the surface layer may be pulled by bonding the surface layer on the elastic layer and thermally expanding the underlying elastic layer.

The internal stress B is preferably −3.0% to −6.0%, and more preferably −4.0% to −5.0%.

The linear expansion rate of the elastic layer can be measured by a TMA curve in which a horizontal axis is temperature and a vertical axis is a linear expansion rate, which is obtained by pulling a measurement sample sampled from the elastic layer in the rotation axis direction of the fixing rotator with a load of 25 mN, raising the temperature from a temperature of 25 °C to 250 °C at a temperature raising rate of 10 °C/min and then holding the temperature for 5 minutes, and then lowering the temperature from the temperature of 250 °C to 25 °C at a temperature lowering rate of 10 °C/min, which will be described later. In the elastic layer at that time, the linear expansion coefficient A in the rotation axis direction of the fixing rotator represented by the formula (ii) and the linear expansion coefficient A2 in the circumferential direction represented by the formula (iii) are each preferably 0.0175%/° C. or more. As a result, it is considered that crystal formation can be performed while applying the internal stress in the rotation axis direction and the circumferential direction of the fixing rotator to the surface layer in the surface layer processing process which will be described later, and thus the linear expansion coefficient of the surface layer can be further reduced.

The linear expansion coefficient A in the rotation axis direction and the linear expansion coefficient A2 in the circumferential direction of the fixing rotator of the elastic layer are each preferably 0.005 to 0.030%/° C., more preferably 0.010 to 0.025%/° C., and still more preferably 0.015 to 0.020%/° C.

The linear expansion coefficient of the elastic layer is determined by the ratio of rubber such as silicone rubber as a matrix having a large linear expansion coefficient as a simple substance to thermally conductive filler having a small linear expansion coefficient as a simple substance, but when the silicone rubber proportion is increased in order to increase the linear expansion coefficient, heat conductivity is reduced, and thus it is preferable that the filler be oriented and aligned in the thickness direction through the electric field orientation process which will be described later, and thus heat conductivity be exhibited with a small amount of filler. In addition, compared to a configuration in which the filler is randomly arranged, since the filler is oriented and aligned in the thickness direction, the filler is relatively sparse in the two directions of the rotation axis direction and the circumferential direction of the fixing rotator opposite to the thickness direction, and thus the influence of the inorganic filler can be reduced, and as a result, the linear expansion coefficient in the rotation axis direction and the circumferential direction of the fixing rotator as the entire elastic layer can be kept high.

In order to orient the filler by charging the surface before rubber curing, it is preferably electrically insulating or semiconductive, and for example, a silicone polymer cured as described later can be used.

The filler may be subjected to surface treatment from the viewpoint of affinity to silicone and electric resistance value. Specifically, those having an active group such as a hydroxyl group on the surface of a filler such as alumina, silica, or magnesium oxide are surface-treated with a silane coupling agent, hexamethyldisilazane, or the like. Metal filler is subjected to surface treatment by forming an oxide film.

Furthermore, the electric resistance value may be adjusted for the entire silicone rubber composition. Even a filler having a relatively low electric resistance value can be used in combination with a second filler having a high electric resistance value to adjust the electric resistance value of the entire composition.

The particle size of the filler is preferably from 0.1 μm to 100 μm, and more preferably from 0.3 μm to 30 μm. The particle size here refers to a volume average particle size.

The content of the filler in the elastic layer is preferably 50 to 200 parts by mass, and more preferably 100 to 180 parts by mass with respect to 100 parts by mass of the silicone rubber from the viewpoint of reducing the hardness.

(2-2) Checking of Oriented Alignment State of Thermally Conductive Filler in Elastic Layer When the elastic layer of the fixing rotator according to the present disclosure includes filler, the filler is preferably oriented and aligned in the thickness direction.

The thermally conductive filler can be oriented and aligned in the elastic layer film thickness direction in the electric field orientation process which will be described later.

When the filler is oriented and aligned in the thickness direction, heat conductivity is easily exhibited with a small amount of filler. In addition, as compared with a configuration in which filler is randomly arranged, since the filler is oriented and aligned in the thickness direction, the filler is relatively sparse in the rotation axis direction and the circumferential direction of the fixing rotator opposite to the thickness direction, whereby the influence of the inorganic filler having a small linear expansion coefficient can be reduced. As a result, the linear expansion coefficients in the two directions of the rotation axis direction and the circumferential direction of the fixing rotator as the entire elastic layer can be kept high.

The alignment state of the thermally conductive filler can be checked by performing two-dimensional Fourier transform using a binarized image obtained from a cross-sectional image of the elastic layer. Specifically, the procedure is as follows.

Figure 5A:
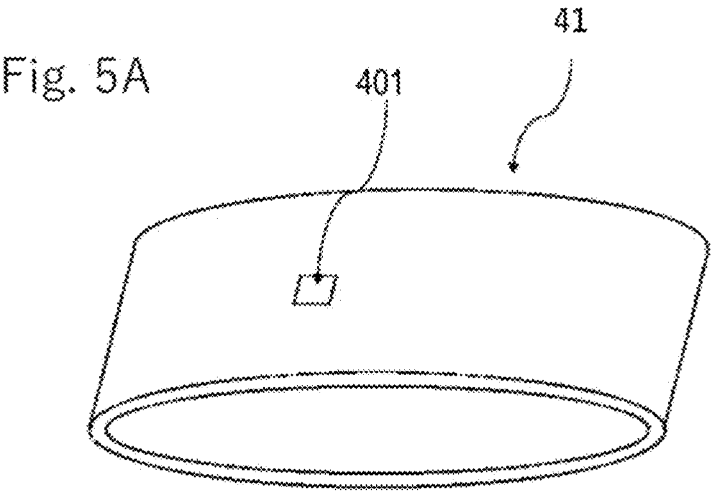
FIGS. 5A and 5B are diagrams showing a first cross section and a second cross section of an elastic layer of a fixing rotator in a belt form.
Figure 5B:
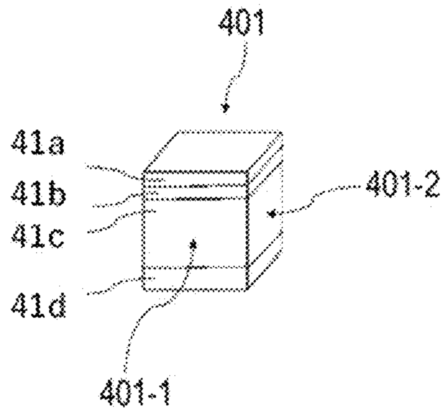

First, a measurement sample is prepared. For example, in a case where the fixing rotator is the fixing belt 41 as shown in FIG. 5A, a sample 401 having a length of 5 mm, a width of 5 mm, and a thickness that is the total thickness of the fixing belt is collected as shown in FIG. 5B. Specifically, a portion corresponding to 5 mm from the center portion of the fixing belt in the rotation axis direction and one round of the fixing belt in the circumferential direction are taken out, one portion is cut and spread, and a sample is collected in a rectangular shape of 5 mmx circumference. Thereafter, the sample is cut at equal intervals of 5 mm in the circumferential direction, and a total of ten samples of 5 mm×5 mm are collected. Among the obtained ten samples, for five samples, a cross section in the circumferential direction of the fixing belt, that is, a cross section including a first cross section 401-1 in the thickness-circumferential direction of the elastic layer is polished using an ion beam. For the remaining five samples, a cross section in a direction orthogonal to the circumferential direction of the fixing belt, that is, a cross section including a second cross section 401-2 in the thickness-rotation axis direction of the elastic layer is polished using an ion beam. A cross section polisher is used for polishing a cross section with an ion beam. In the polishing process of the cross section by the ion beam, it is possible to prevent dropping of the filler from the samples and mixing of the polishing agent, and it is possible to form a cross section with few polishing marks.

Figure 6A:
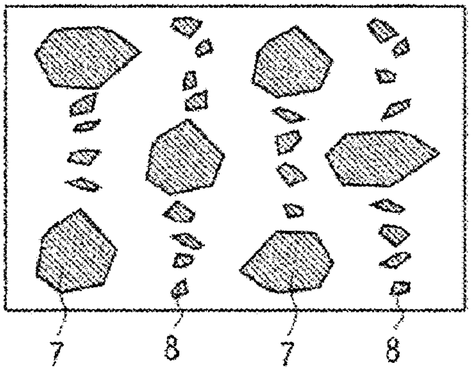
FIGS. 6A to 6D are schematic views showing a method of checking an arrangement degree and an arrangement angle of filler in an elastic layer.

Subsequently, for the five samples in which the first cross section of the elastic layer has been polished and the five samples in which the second cross section of the elastic layer has been polished, each polished cross section is observed with a laser microscope (OLS3000 manufactured by Olympus Corporation, 50 times objective lens used) or a scanning electron microscope (SEM) (S4700, manufactured by Hitachi, Ltd.) to acquire a cross-sectional image of a region of 150 μm×100 μm (FIG. 6A).

Figure 6B:
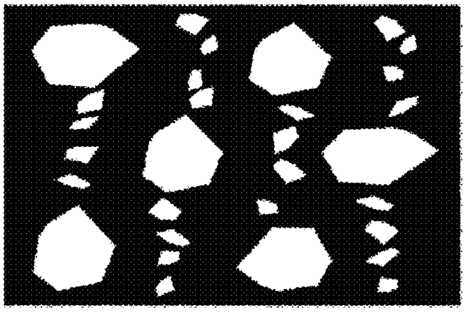

Next, the obtained image is subjected to black-and-white binarization processing using commercially available image software (image-J) such that the filler portion becomes white and the silicone rubber portion becomes black (FIG. 6B). The Otsu method is used as a binarization method.

Figure 6C:
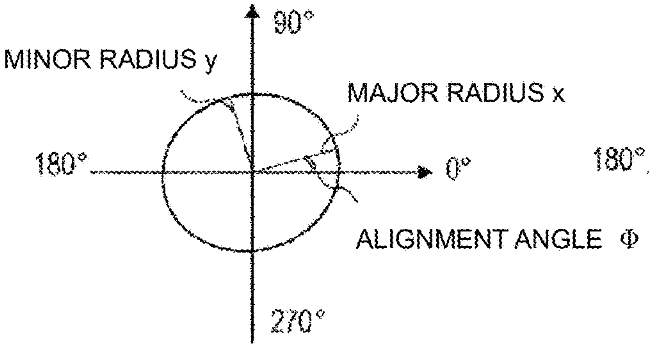
Figure 6D:
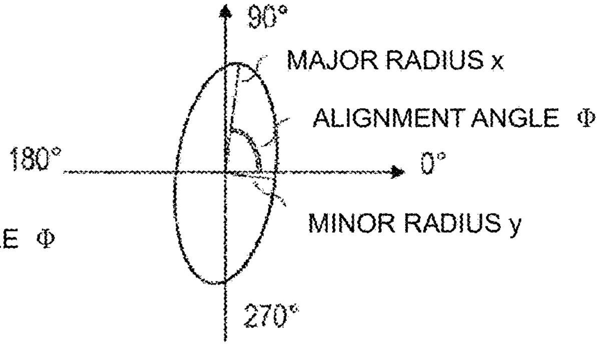

Furthermore, by performing two-dimensional Fourier transform analysis on the filler image, elliptic plot diagrams representing the direction and degree of filler alignment are obtained (FIGS. 6C and 6D). Since the two-dimensional Fourier transform itself has a peak in the orthogonal direction with respect to periodicity of the binarized image, the elliptic plot diagrams are results of shifting the phase of the result of the two-dimensional Fourier transform by 90°. From the angle formed by the ellipse major radius in the ellipse plot diagrams, the filler alignment degree F. defined as an alignment angle Φ and $f=1-(y/x)$ when the major radius is x and the minor radius is y is obtained.

The alignment angle Φ represents the alignment direction of the filler, the 90°-270° direction represents the thickness direction of the elastic layer, and the 0°-180° direction represents the circumferential direction or the rotation axis direction of the elastic layer in FIGS. 6C and 6D. Therefore, the closer the alignment angle Φ is to 90°, the more the filler is aligned in the thickness direction.

In addition, the alignment degree F. represents the oblateness of the ellipse, and has a value of 0 or more and less than 1. When f is 0, it becomes a circle and represents a completely random state in which the filler is not aligned, and as f approaches 1, the flatness of the ellipse increases and the alignment degree of the filler also increases.

In this manner, a total of ten binarized images of a first binarized image having a size of 150 μm×100 μm at five locations in the first cross section in the thickness-circumferential direction of the elastic layer and a second binarized image having a size of 150 μm×100 μm at five locations in the second cross section in the thickness-rotation axis direction of the elastic layer are acquired. Then, in the binarized images, the average value of the area ratio of the thermally conductive filler, the average alignment degree F. of the thermally conductive filler, and the average alignment angle Φ of the thermally conductive filler are measured. For each average value, an average value of numerical values at a total of ten locations is calculated.

The average alignment degree F. of the filler is preferably 0.10 to 0.50, and more preferably 0.13 to 0.35. When f is 0.10 or more, the thermal conductivity is easily exhibited, and when f is 0.50 or less, the hardness of the elastic layer is easily reduced.

The average alignment degree F. can be controlled by a grid voltage (Vp-p), an application time, a frequency, and the like in an electric field applying process which will be described later.

The average alignment angle Φ of the thermally conductive filler is preferably 28° to 90°, more preferably 30 to 90°, and may be 30 to 55°. Since the direction in which Φ is 90° is the thickness direction of the elastic layer, the closer Φ is to 90°, the more aligned the thickness direction. Therefore, when Φ is in the above range, thermal conductivity in the thickness direction can be enhanced. Here, 30° and 150° are in a mirror image relationship with 90° as a boundary, and thus have the same meaning as the heat transfer function in the thickness direction. Therefore, the alignment angle was expressed by 0 to 90°.

The average alignment angle Φ can be controlled by a grid voltage (Vp-p), an application time, a frequency, and the like in the electric field applying process which will be described later.

The average value of the area ratio (%) of the thermally conductive filler is preferably 27 to 45%, and more preferably 30 to 45%. Here, the area ratio of the filler refers to [(sum of areas of filler in binarized image×100)/(area of binarized image)]. When the average area ratio of the filler is 27% or more, the distance between the fillers is appropriate, a sufficiently large local electric field can be generated when an electric field is applied, and it is easy to sufficiently align the filler. Further, when the average area ratio of the filler is 45% or less, the hardness of the elastic layer can be sufficiently reduced.

(2-3) Process of Applying Electric Field to Elastic Layer

Hereinafter, a process of applying an electric field to the corona charger 2 and the elastic layer using the same will be described as an embodiment. Corona charging methods include a scorotron method having a grid electrode between a corona wire and an object to be charged and a corotron method having no grid electrode, but the scorotron method is preferable from the viewpoint of controllability of the surface potential of the object to be charged.

Figure 4A:
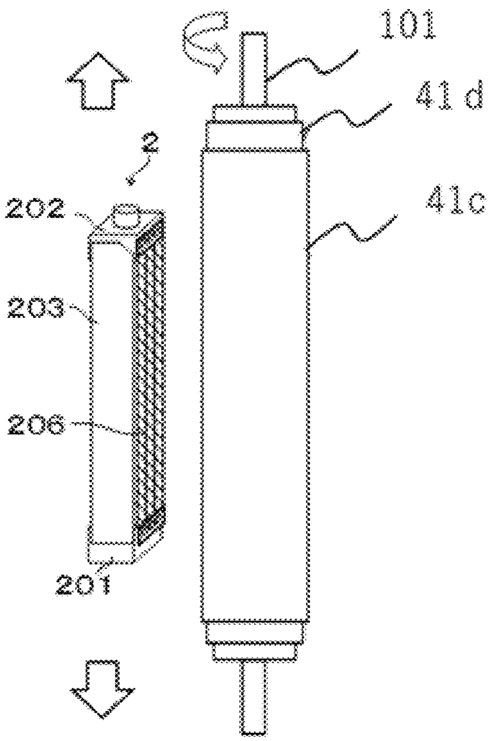
FIG. 4A is an overhead view of an example of a corona charger.
Figure 4B:
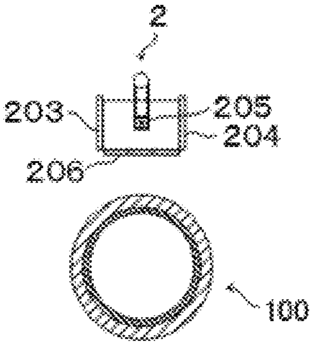
FIG. 4B is a cross-sectional view of an example of the corona charger.

As shown in FIGS. 4A and 4B, the corona charger 2 includes a front block 201, a back block 202, and shields 203 and 204. In addition, when a discharge wire 205 is stretched between the front block 201 and the back block 202 and a charging bias is applied by a high-voltage power supply, the surface of the elastic layer 41*c* before curing on the base layer as the object to be charged is charged by discharging.

Similarly to the configuration of a general corona charger, a high voltage is applied to the discharge wire 205 as a discharge member. Then, the ion flow obtained by discharge to the shields 203 and 204 is controlled by applying a high voltage to the grid 206, and the surface of the elastic layer 41*c* is controlled to a desired charging potential. At this time, since the base layer 41*d* or a core 101 holding the base layer 41*d* is grounded (not illustrated), a desired electric field can be generated in the elastic layer 41*c* by controlling the surface potential of the surface of the elastic layer 41*c*.

The method of manufacturing the fixing rotator of the above embodiment will be described in detail. First, an elastic layer having silicone rubber containing thermally conductive filler is formed on a base layer. Next, as shown in FIG. 4A, the corona charger 2 is disposed to face closely the elastic layer 41*c* in the width direction of the elastic layer 41*c* before the fixing belt 41 is cured. Then, a voltage is applied to the grid 206 of the corona charger 2, and the fixing belt 41 is rotated, for example, at 141 rpm for 160 seconds in a discharged state to charge the surface of the elastic layer. The distance between the surface of the elastic layer and the grid 206 can be 1 mm to 10 mm. By charging the surface of the elastic layer 41*c* in this manner, an electric field is generated in the elastic layer, and the thermally conductive filler is oriented. Thereafter, the elastic layer is cured by heating or the like to fix the orientation of the filler.

The voltage applied to the grid 206 is preferably in the range of 0.1 kV to 3 kV (0.2 to 6 kV at Vp-p in the case of AC application) as an absolute value from the viewpoint of generating an effective electrostatic interaction with the filler. In the case of forming orientation of the filler in the thickness direction of the elastic layer using an electric field, it is important to generate an electric field in the thickness direction of the elastic layer 41*c*. If the sign of the voltage to be applied is equal to the sign of the voltage to be applied to the wire, the direction of the electric field is reversed regardless of whether the sign is negative or positive, but the obtained effect is the same.

In addition, in the case of AC charging in order to curb liquid surface flow which will be described later, it is desirable to match the phases of the waveforms of the wire and the grid. Depending on the type of thermally conductive filler, it may be difficult to form orientation of amorphous filler, and in this case, it is desirable to increase the voltage applied to the grid 206. This is presumed to be related to the dielectric constants of the silicone rubber component and the thermally conductive filler. When the difference in dielectric constants between the silicone rubber and the filler is large, it is possible to form orientation of the amorphous filler with a relatively low applied voltage.

On the other hand, when the voltage applied to the grid 206 is excessively high, the electrostatic repulsive force due to the surface charge of the elastic layer increases, causing liquid surface flow, and the surface property of the elastic layer 41*c* may be deteriorated. Therefore, the voltage applied to the grid 206 is more preferably in the range of 0.1 kV to 1.5 kV (1.2 to 3 kV at Vp-p in the case of AC application) as an absolute value. This liquid surface flow can be alleviated by AC charging.

Figure 7:
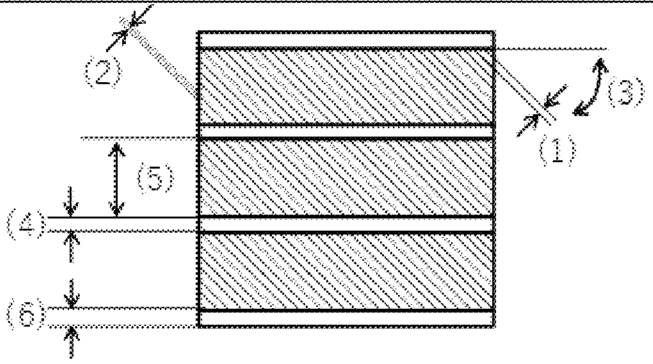
FIG. 7 is a partially enlarged view of a grid used in a corona charger.

Here, the grid as a control electrode stretched in the opening longitudinal direction of the corona charger will be described. Hereinafter, even in a case where there is no particular description, the grid refers to a grid in which a plurality of apertures (through-holes) penetrating the grid are formed in a mesh shape. FIG. 7 is an enlarged view of a part of the grid 206 as viewed from the elastic layer side in order to describe an example of the outer shape of the grid.

As shown in FIG. 7, a central portion of the grid 206 in a short-side direction (a direction in which the shields 203 and 204 in FIG. 4B face each other) has a mesh shape, and both end portions in the short-side direction are beam portions having a width of 1.5±0.1 mm as indicated by (6). The width of the through-hole of the grid 206 is 0.312±0.03 mm as indicated by (1). The angle of the through-hole with respect to the longitudinal direction of the grid 206 is 45±1° as indicated by (3). (2) is the thickness of the mesh material and is 0.071±0.03 mm. Between the mesh parts, beams having a width of 0.1±0.03 mm indicated by (4) are disposed in the longitudinal direction in order to curb deflection of the grid 206 at intervals of 6.9±0.1 mm indicated by (5).

For the width of the through-hole of the mesh, a shape pattern including 1.0 mm or less is preferably etched from the viewpoint of making the charging potential of the surface of the elastic layer more uniform. In addition, the higher the area ratio of the mesh portion to the through-hole portion, the more easily the charging potential is made uniform. The flat plate-shaped grid 206 can be disposed between the discharge wire 205 and the surface of the elastic layer, and the distance between the surface of the elastic layer and the grid 206 is preferably in a range of 1 mm to 10 mm from the viewpoint of making the charging potential of the surface of the elastic layer uniform.

As shown in FIG. 7, the flat plate-shaped grid 206 is stretched by stretching portions disposed in the front block 201 and the back block 202. By operating knobs of the stretching portions, the grid 206 is released from the support and can be easily attached and detached. Further, in the grid 206, a bent shape is given to a part of the flat plate in the vicinity of the stretching portions, and some elasticity is provided. Therefore, even in a state in which the grid 206 is stretched around the corona charger 2, the grid can move to some extent when receiving an external force. Note that the flat plate-shaped grid may have a mesh shape as shown in FIG. 7, but is not intended to be limited to this shape. For example, it may be a flat plate-like grid having a honeycomb structure shape as disclosed in Japanese Patent Laid-Open No. 2005-338797.

As a configuration of potential control of the surface of the elastic layer in the rotation axis direction of the fixing rotator, for example, a configuration shown in FIG. 4A can be used. While a voltage is applied to the grid 206, the entire elastic layer 41*c* can be charged by rotating the central axis of the core 101 as a rotation axis. It is preferable that the rotation speed of the fixing rotator be 10 rpm to 500 rpm and the processing time be 20 seconds or more from the viewpoint of stably forming orientation of the filler. The processing time is, for example, 20 to 200 seconds. As described above, the formation of orientation of the amorphous filler can be controlled by controlling the surface potential and the time for applying the electric field.

As the discharge wire 205, stainless steel, nickel, molybdenum, tungsten, or the like may be used, but it is preferable to use tungsten having very high stability among metals. Note that the discharge wire stretched inside the shields may have a circular cross-sectional shape or a shape like a sawtooth.

Further, the diameter of the discharge wire 205 is preferably 40 μm to 100 μm. This is because by setting the diameter of the discharge wire within such a range, it is possible to prevent the discharge wire from being cut by ions at the time of discharge, and it is not necessary to excessively increase the voltage required to cause corona discharge. The voltage applied to the discharge wire 205 can be either a DC voltage or an AC voltage. In the case of an AC voltage, the frequency is preferably about 0.01 Hz to 1000 Hz. The voltage can be obtained by causing an arbitrary waveform generator to output a rectangular wave, a sine wave, or the like.

(3) Adhesive Layer

The adhesive layer is not particularly limited as long as it can bond the elastic layer and the surface layer. For example, an addition-curable silicone rubber adhesive is used. The addition-curable silicone rubber adhesive has an uncrosslinked component of silicone rubber, and has a function of bonding the surface layer and the elastic layer by bonding the inner surface processing layer of the surface layer and the uncrosslinked component of the elastic layer by heating. Specifically, it contains an organopolysiloxane having a plurality of unsaturated aliphatic groups represented by vinyl groups in the molecular chain, a hydrogen organopolysiloxane, and a platinum compound as a crosslinking catalyst. Then, curing is performed by addition reaction. As such an adhesive, a known adhesive can be used.

The thickness of the adhesive layer is preferably 20 μm or less. When the thickness is 20 μm or less, the thermal resistance of the fixing rotator can be set small, and the heat from the inner surface side (base layer side) can be efficiently transferred to a recording material (recording medium). The thickness of the adhesive layer is, for example, 1 to 20 μm or 2 to 10 μm.

(4) Surface Layer

The material of the surface layer 41*a* is not particularly limited, but preferably contains a fluororesin. Examples of the fluororesin include polytetrafluoroethylene (PTFE), a tetrafluoroethylene-hexafluoropropylene copolymer (FEP), and a tetrafluoroethylene-perfluoro (alkyl vinyl ether) copolymer (PFA), and PFA is preferable from the viewpoint of mold releasability and rigidity. As the PFA, commercially available PFA can be used. Specific examples thereof include AP-230 (trade name, manufactured by Daikin Industries, Ltd.), AP-231SH (trade name, manufactured by Daikin Industries, Ltd.) which is PFA having a completely fluorinated terminal group, and 451HP-J (trade name, manufactured by Mitsui Chemmers FluoroProducts Inc.) having a small spherulite size.

The thickness of the surface layer 41*a* is preferably 100 μm or less, and more preferably 10 to 70 μm.

By performing sodium treatment, excimer laser treatment, ammonia treatment, or plasma etching treatment on the inner surface of the surface layer 41*a* in advance, adhesiveness can be improved. In examples of the present disclosure, a PFA tube having a thickness of 20 μm obtained by extrusion molding was used.

The surface layer is preferably not a heat shrinkable tube. Increase in the hardness of the central portion can be curbed, followability is hardly deteriorated, and gloss unevenness can be further curbed by maintaining flexibility.

The PFA tube can be manufactured, for example, by extruding molten PFA from a cylindrical die. Such a PFA tube is rapidly cooled and crystallized rapidly in the process of being extruded, and thus crystals are oriented in the extrusion direction and the crystallinity is low. By coating the surface of the elastic layer 41*c* with the PFA tube to form the surface layer 41*a*, and then performing surface layer heat treatment which will be described later, the degree of crystallinity can be increased, and spherulites are formed at the surface of the surface layer.

In the present disclosure, in a TMA curve in which the horizontal axis represents the temperature and the vertical axis represents the linear expansion rate, which is obtained by raising the temperature of a measurement sample sampled from the surface layer 41*a* from 25 °C to 250 °C at a temperature raising rate of 10 °C/min while pulling the measurement sample in the rotation axis direction of the fixing rotator with a load of 25 mN, the linear expansion rate at the temperature of 200 °C is defined as C. C is, for example, −0.5 to 2.0%, preferably 0 to 1.5% or less. If C is 1.5% or less, surface layer wrinkling after durability are less likely to occur, and if C is 0% or more, gloss unevenness can be further curbed.

A method of sampling the measurement sample and a method of acquiring the TMA curve will be described later in examples.

The linear expansion rate C can be controlled by the crystallinity of the surface layer. For example, the linear expansion rate C is easily decreased by heating the surface layer to increase the crystallinity. It is preferable to control heat treatment and a cooling rate on the elastic layer. By controlling the heat treatment and the cooling rate on the elastic layer having a large linear expansion rate to some extent, the crystal portion is easily formed in a state in which stress is applied in the rotation axis direction of the fixing rotator. Furthermore, by controlling the cooling rate, the crystal portion is more likely to increase. As a result, the linear expansion rate tends to be decreased.

In addition, in an endothermic curve when calorimetry is performed by heating a measurement sample sampled from the surface layer 41*a* from a temperature of 25 °C to a temperature of 400 °C at a temperature raising rate of 20 °C/min using a differential scanning calorimeter (DSC), an endothermic quantity in the temperature rising process is preferably 21 J/g or more. Hereinafter, a case in which the surface layer 41*a* is made of PFA will be described as an example, but the present disclosure is not limited thereto.

The endothermic quantity in the temperature raising process is an endothermic quantity due to crystal melting of PFA. The crystallinity of PFA can be calculated by dividing the value of the endothermic quantity by complete crystal melting heat (92.9 J/g) of PTFE. Since the endothermic quantity is 21 J/g or more, there are many crystal portions to which the internal stress has been applied, and the linear expansion coefficients in the rotation axis direction and the circumferential direction of the fixing rotator can be reduced.

Examples of the method of setting the endothermic quantity to 21 J/g or more include a method in which crystallization of PFA is promoted by controlling the cooling rate after heating to a temperature equal to or higher than the melting point of PFA after formation of surface layer 41*a* in the process of manufacturing the fixing rotator.

The specific method is not particularly limited, but the following method of heating the surface layer can be used.

In order to heat the entire region of the fixing rotator, an upright cylindrical heating cylinder capable of heating to 330 °C or higher is used. A band heater to which a thermocouple has been attached is provided inside the heating cylinder to control the heating temperature of the fixing rotator. The heating temperature is preferably from the melting temperature of PFA to 380 °C. The heating time may be any time as long as the temperature of the surface layer can sufficiently reach a desired temperature, and examples thereof include 1 to 20 minutes, 1 to 10 minutes, and 2 to 5 minutes.

After heating is completed, the cooling rate of the fixing rotator is controlled by controlling the cooling rate of the heating cylinder. For example, the cooling speed can be controlled by providing an air supply nozzle on the outer periphery of the heating cylinder and adjusting the flow rate of air. The crystallization of PFA can be promoted as the cooling rate in the crystallization temperature range of PFA is lower, and it is preferable to adjust the cooling rate such that the endothermic quantity becomes 21 J/g or more. The cooling rate is preferably controlled until the temperature of the surface layer falls below the crystallization temperature range of PFA. The cooling rate is, for example, 5 to 50 °C/min, or 10 to 30 °C/min.

Then, a cooling process can be performed after heating. The cooling process is, for example, as follows. After heating is completed, the heating cylinder is cooled. Cooling is performed, for example, by providing an air supply nozzle on the outer periphery of the heating cylinder and adjusting the flow rate of air. The cooling rate is preferably high to some extent so as not to increase the spherulite diameter. Cooling is performed at a cooling rate of preferably 100 to 500 °C/min, and more preferably 150 to 250 °C/min. For example, the cooling rate may be achieved by performing natural cooling in the atmosphere (25 °C). It is considered that small crystals of a plurality of spherulites can be generated by performing such rapid cooling. (The processing so far is referred to as first-stage annealing processing)

After sufficient cooling, second heat treatment is performed. A device similar to that for the first heat treatment may be used. When the surface layer is heated again and held for a certain period of time, further crystallization proceeds. The heating temperature may be in a range from a glass transition temperature at which crystallization proceeds to a temperature lower than a complete melting temperature. The condition for the second heat treatment is preferably a temperature lower than the melting point of PFA by about 10 °C The heating time may be any time as long as the temperature of the surface layer sufficiently reaches a desired temperature and the surface layer can be kept at a temperature at which the progress of crystallization can proceed for a certain period of time or more. The time is preferably 1 to 20 minutes, 1 to 10 minutes, or 2 to 5 minutes (for example, 3 minutes).

By heating, that is, annealing at a temperature lower than the complete melting temperature, a portion that is not crystallized by the first heat treatment is also crystallized, and the crystallinity is increased. The crystal generated by the second heat treatment is a more stable crystal with high crystallinity and is considered to be a crystal that can correspond to a peak P1 in a DSC chart which will be described later. As described above, since a crystal having small spherulites is generated by rapid cooling in the first heat treatment, it is considered that the spherulites are less likely to increase even if the crystallinity is improved.

Although the crystallinity is increased, the crystal is less likely to increase, and thus the flatness of the fixing belt is not impaired. Therefore, gloss unevenness can be curbed.

Thereafter, cooling may be performed in the same manner as in the first heat treatment. Cooling is performed at a cooling rate of preferably 100 to 500 °C/min, and more preferably 150 to 250 °C/min. For example, the cooling rate may be achieved by performing natural cooling in the atmosphere (25 °C).

(The Above Processing is Referred to as Second-Stage Annealing Processing)

The crystallinity of the surface layer 41*a* can be checked by the following calorimetry.

Figure 9:
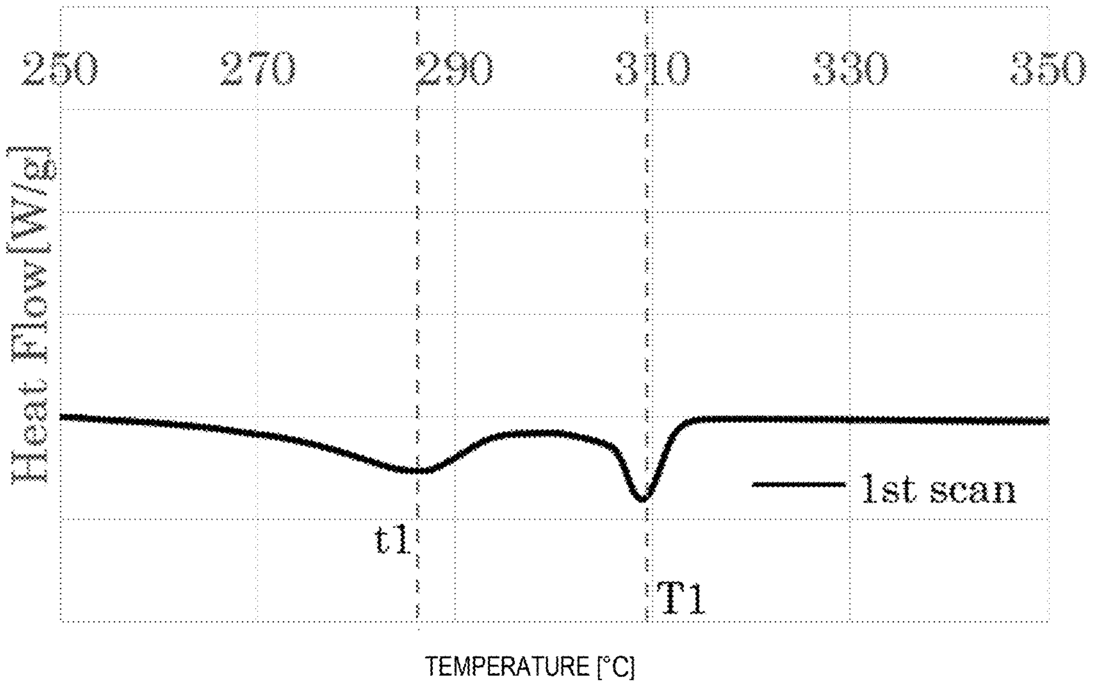
FIG. 9 is an example of a DSC chart of a surface layer sample.

Using a sample sampled from the surface layer 41*a* as a measurement sample, calorimetry is performed by sequentially performing the following processes (1) and (2) using a differential scanning calorimeter (DSC). An example of a DSC chart is shown in FIG. 9.

Process (1): a temperature raising process of heating the measurement sample from a temperature of 25 °C to a temperature of 400 °C at a temperature raising rate of 20 °C/min (held at 400 °C for 5 minutes after temperature raising)

Process (2): a temperature lowering process of cooling the measurement sample heated to a temperature of 400 °C in process (1) to a temperature of 25 °C at a temperature lowering rate of 20 °C/min The fact that the surface layer has at least two endothermic peaks in a first DSC chart obtained in process (1) indicates that crystals having different melting points are present.

In addition, having at least one endothermic peak in a second DSC chart obtained in process (2) indicates that a crystal having a certain melting point is present. It is preferable that at least two endothermic peaks be present in the first DSC chart. In addition, it is preferable that at least one endothermic peak be present in the second DSC chart.

As shown in 1st scan of FIG. 9, in the first DSC chart, a peak P2 indicating t1 first appears, and then a peak P1 indicating T1 appears. When two peaks appear in this manner, the peak P2 on the lower temperature side is considered to be a peak due to a crystal having small spherulite. The peak P1 at a high temperature appearing thereafter is a peak having higher crystallinity.

It is considered that not one broad peak but two clear peaks in the 1st scan in the temperature raising process are caused by the influence of the peak P1 having stable higher crystallinity. That is, it is considered that in the temperature raising process, a crystal having higher crystallinity, which can become the peak P1, is not dissolved at a temperature at which the peak P2 appears, and crystallization proceeds in the subsequent temperature raising process up to T1. It is considered that at least two peaks are obtained as shown in FIG. 9 due to the influence of heat generation due to this crystallization.

Therefore, the appearance of at least two peaks in the temperature raising process is considered to indicate the presence of crystals having small spherulites and the presence of crystals having higher crystallinity. The peak P1 is considered to be a peak that promotes growth of an amorphous portion of the crystal that could not be grown by the first-stage annealing treatment, at which the entire crystals included in the surface layer including the formed crystals having high have been melted.

By performing the second-stage annealing treatment, the growth of the amorphous portion of the crystal that could not be grown by the first-stage annealing treatment can be promoted, and the crystallinity can be increased. Therefore, since the ratio of crystals to which the internal stress has been applied by the method which will be described later increases, the internal stress of the surface layer in the rotation axis direction of the fixing rotator is improved, and occurrence of wrinkling can be curbed.

In addition, as described above, the lower endothermic peak P2 of the at least two endothermic peaks in the first DSC chart indicates that small spherulites are present. It is conceived that the presence of the peak P2 and the presence of the peak P1 indicate that crystallization is performed at a higher temperature in a state in which a small spherulite exhibiting the peak P2 is present on the surface layer, and thus a crystal having the peak P1 is obtained. When the crystallinity is increased in a state in which a small spherulite is present, spherulite generated at a high temperature that are originally likely to be large are unlikely to be large due to the presence of the small spherulite as a barrier. Therefore, it is considered that the surface smoothness of the surface layer is not impaired, and gloss unevenness can be curbed.

It is considered that having at least two endothermic peaks in the first DSC chart indicates that the crystallinity of crystals in the surface layer is high and the spherulite can be controlled to be small. Therefore, it is considered that both curbing of occurrence of wrinkling and surface smoothness can be achieved.

EXAMPLES

Hereinafter, the present disclosure will be described in more detail using examples.

Example 1

The elastic layer 1 described in Table 1 was manufactured as follows to obtain a fixing belt of example 1.

(1) Preparation of Liquid Addition-Curable Silicone Rubber Composition

First, as the component (a), 100 parts by mass of a silicone polymer having a vinyl group as an unsaturated aliphatic group only at both molecular chain terminals and a methyl group as an unsubstituted hydrocarbon group not containing an unsaturated aliphatic group was prepared. This silicone polymer (trade name: DMS-V35, manufactured by Gelest, viscosity: 5000 $mm^2/s$) is hereinafter referred to as “Vi.”

Subsequently, as shown in Table 1, 160 parts by mass of metal silicon (trade name: #350, manufactured by Kinse-MATEC Co., Ltd.) as the component (d) of thermally conductive filler was added to Vi and sufficiently mixed to obtain mixture 1.

Subsequently, a solution obtained by dissolving 0.2 parts by mass of 1-ethynyl-1-cyclohexanol (manufactured by Tokyo Chemical Industry Co., Ltd.) as a curing retarder in the same weight of toluene was added to mixture 1 to obtain mixture 2.

Subsequently, 0.1 parts by mass of a hydrosilylation catalyst (platinum catalyst: mixture of 1,3-divinyltetramethyldisiloxane platinum complex, 1,3-divinyltetramethyldisiloxane and 2-propanol) as the component (c) was added to mixture 2 to obtain mixture 3.

Further, as the component (b), 2.0 parts by mass of a silicone polymer (trade name: HMS-301, manufactured by Gelest, viscosity: 30 $mm^2/s$, hereinafter referred to as “SiH”) having a linear siloxane backbone and having an active hydrogen group bonded to silicon only in the side chain was weighed. This was added to mixture 3 and sufficiently mixed to obtain a liquid addition-curable silicone rubber composition.

(2) Preparation of Fixing Belt

As a base layer, an SUS endless belt having an inner diameter of 24 mm, a width of 400 m, and a thickness of 30 μm was prepared. During a series of manufacturing processes, the endless belt was handled by inserting a core into the endless belt.

On the outer peripheral surface of the base layer, a primer (trade name: DY39 051 A/B, manufactured by Dow Corning Toray Co., Ltd.) was applied substantially uniformly so as to have a dry weight of 20 mg, and the solvent was dried and then subjected to baking treatment for 30 minutes in an electric furnace set at 160 °C The silicone rubber composition was applied onto the primer-treated base layer in a thickness of 250 μm by a ring coating method. This is referred to as an uncured endless belt.

Subsequently, a corona charger having a charging region width of 295 mm was disposed to face along the generatrix of the uncured endless belt, and an AC electric field was applied to the surface of the elastic layer before curing while rotating the uncured endless belt at 100 rpm. Manufacturing was performed on conditions that the supply current to the discharge wire of the corona charger is ±150 μA, the grid electrode potential is ±300 V (Vp-p: 600 V), the frequency is 0.025 Hz, the distance between the grid electrode and the belt is 3 mm, and the charging time is the time shown in Table 1.

The charged uncured endless belt was heated in an electric furnace at 160 °C for 1 minute (primary curing), and then heated in an electric furnace at 200 °C for 30 minutes (secondary curing) to cure the silicone rubber composition, thereby obtaining an endless belt including the cured elastic layer 1.

Subsequently, an addition-curable silicone rubber adhesive (trade name: SE1819CV A/B, manufactured by Dow Corning Toray Co., Ltd.) was applied substantially almost uniformly to a thickness of about 10 μm on the surface of the cured elastic layer of the endless belt as an adhesive layer. On the other hand, as a surface layer, PFA (trade name: AP-231SH, manufactured by Daikin Industries, Ltd.) was extruded to an inner diameter of 23 mm and a thickness of 20 μm to prepare a fluororesin tube (listed in Table 2, AP-231SH (trade name, manufactured by Daikin Industries, Ltd.)) with an inner surface etched. The fluororesin tube was laminated on the endless belt provided with the adhesive layer while expanding the diameter. Thereafter, by uniformly pressing the belt surface from above the fluororesin tube, excess adhesive was pressed out from between the elastic layer and the fluororesin tube until the thickness was approximately 5 μm.

The endless belt was heated in an electric furnace set at 200 °C for 1 hour to cure the adhesive, and the fluororesin tube was fixed on the elastic layer.

(3) Stress Application on Surface Layer

The obtained endless belt was inserted into a heating cylinder with an inner diameter of q 42 mm and heated with a band heater inside the heating cylinder. Before performing the heat treatment, both ends of the fluorine resin tube were fixed, and while performing the heat treatment, tension was applied at the fixed portions to perform drawing treatment in the rotation axis direction and the circumferential direction of the fixing rotator (this operation is referred to as fixed drawing application). As described in Table 2, the heating control temperature of the fixing rotator was set to 330 °C, heating control was performed such that the actual temperature of the surface layer was the melting temperature of PFA or higher, drawing is performed by 4% with respect to the entire length in the rotation axis direction and by 4% with respect to the circumferential length in the circumferential direction in the rotation axis direction of the fixing rotator, and heat treatment was performed while a state in which stress was applied in the rotation axis direction and the circumferential direction was maintained.

The heating time was set to a time during which the actual temperature of the surface layer can sufficiently reach a desired temperature, and was set to 3 minutes while applying stress in the rotation axis direction and the circumferential direction of the fixing rotator after putting the fixing belt into the heating cylinder. After elapse of 3 minutes from putting, the heating cylinder was cooled to 200 °C at a rate of 20 °C/min, and then the fixing belt was taken out from the heating cylinder under a normal temperature atmosphere, and both ends of the obtained endless belt were cut to obtain a fixing belt having a width of 336.5 mm.

(3) Evaluation of Characteristics of Fixing Belt Elastic Layer (3-1) Measurement of Linear Expansion Coefficient of Elastic Layer in Rotation Axis Direction and Circumferential Direction of Fixing Rotator Method of Measuring Linear Expansion Coefficient First, the elastic layer was isolated from the fixing rotator. Specifically, the elastic layer was isolated by inserting a razor into the substrate-elastic layer interface and the surface-elastic layer interface.

Thereafter, the elastic layer was cut into a strip shape of 16 mm×6 mm to prepare a sample.

At the time of measurement in the rotation axis direction of the fixing rotator, the elastic layer was cut into 16 mm in the rotation axis direction, 6 mm in the circumferential direction, and at the time of measurement in the circumferential direction, the elastic layer was cut into 6 mm in the rotation axis direction, 16 mm in the circumferential direction.

Subsequently, using a thermomechanical analyzer (TMA), the sample was placed on a sample attachment with the top and bottom fixed in the direction of the measurement direction, and measurement was performed under the following conditions.

Apparatus; thermomechanical analyzer TMA/SDTA2+ (trade name, manufactured by Mettler Toledo)

Load; 25 mN

Temperature; the temperature was raised from 25 °C to 250 °C at 10 °C/min, then held for 5 minutes, and the temperature was lowered from 250 °C to 25 °C at 10 °C/min.

Since the initial length of the elastic layer at 25 °C is not stable at the time of attachment due to ease of stretching and contracting of the rubber, the length at 100 °C in the process of raising the temperature to 250 °C while applying a load of 25 mN was used as a reference.

The linear expansion coefficient A [%/° C.] when the length in the rotation axis direction at a temperature of 100 °C in the temperature raising process was denoted by L1e and the length in the rotation axis direction at a temperature of 200 °C in the temperature lowering process was denoted by L2e was calculated by the following formula (ii).

$$A = \left((L2e - L1e)/L1e\right) \times 100/(200 - 100) \quad \text{(ii)}$$

Similarly, the linear expansion coefficient A2 [%/° C.] in the circumferential direction when the length in the circumferential direction at 100 °C in the temperature raising process of the measurement sample is denoted by L3e and the length at 200 °C in the temperature lowering process when the measurement sample is heated from a temperature of 25 °C to 250 °C at a temperature raising rate of 10 °C/min, held for 5 minutes, and then cooled from the temperature of 250 °C to 25 °C at a temperature lowering rate of 10 °C/min while being pulled in the circumferential direction with a load of 25 mN is denoted by LAe was calculated by the following formula (iii).

$$A2 = (L4e - L3e)/L3e \times 100/(200 - 100) \quad \text{(iii)}$$

Table 1 shows the results of the linear expansion coefficients A and A2 in the rotation axis direction and the circumferential direction of the fixing rotator.

(3-3) Measurement of Internal Stress of Surface Layer in Rotation Axis Direction of Fixing Rotator As will be described below, the internal stress of the surface layer in the rotation axis direction of the fixing rotator can be measured from the ratio of the contraction lengths at the start point and the end point to the initial stage at 25 °C on a TMA curve obtained by raising the temperature from 25 °C to 250 °C at 10 °C/min, holding the temperature for 5 minutes, and lowering the temperature from 250 °C to 25 °C at 10 °C/min.

First, the surface layer is isolated from the fixing rotator. Specifically, the surface layer is peeled off from the substrate together with the elastic layer, and only the surface layer is isolated by dissolving the elastic layer bonded to the surface layer with a solvent. Thereafter, the surface layer is cut into strip shapes of 16 mm in the rotation axis direction of the fixing rotator and 6 mm in the circumferential direction to obtain samples.

Subsequently, a sample was placed on a sample attachment using a thermomechanical analyzer (TMA), and measurement was performed under the following conditions.

Apparatus; thermomechanical analyzer TMA/SDTA2+ (trade name, manufactured by Mettler Toledo)

Load; 25 mN

Temperature; The temperature was raised from 25 °C to 250 °C at 10 °C/min, then held for 5 minutes, and the temperature was lowered from 250 °C to 25 °C at 10 °C/min.

When the length of the fixing rotator in the rotation axis direction at a temperature of 25 °C at the time of measurement was denoted by L1s, and the length when the temperature was raised from 25 °C to 250 °C at 10 °C/min, held for 5 minutes, and then lowered from 250 °C to 25 °C at 10 °C/min was denoted by L2s, the internal stress B [%] of the surface layer was calculated from the following formula (i).

$$B = (L2s - L1s)/L1s \times 100 \quad \text{(i)}$$

When the temperature is raised from 25 °C to 250 °C at 10 °C/min, held for 5 minutes, and lowered from 250 °C to 25 °C at 10 °C/min, the internal stress is relaxed, and the surface layer contracts. The difference can be calculated by this formula (i). That is, the double arrow part in FIG. 8A indicates the internal stress of the surface layer.

Since the surface layer and the elastic layer are bonded to each other by the adhesive layer when the fixing belt is used, even if the temperature is raised from 25 °C to 250 °C at 10 °C/min, held for 5 minutes, and lowered from 250 °C to 25 °C at 10 °C/min, the surface layer cannot freely expand and contract due to bonding between the elastic layer and the surface layer. Therefore, in this measurement, the surface layer is isolated from the elastic layer.

Figure 8A:
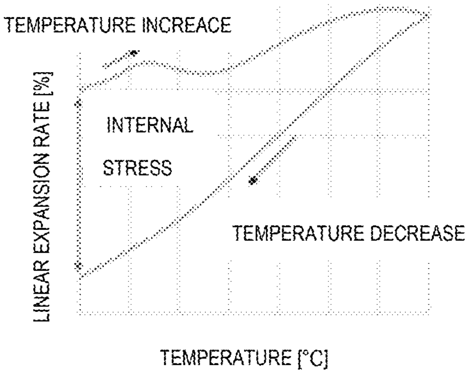
FIGS. 8A to 8C are diagrams of TMA curves in examples of the present disclosure.
Figure 8C:
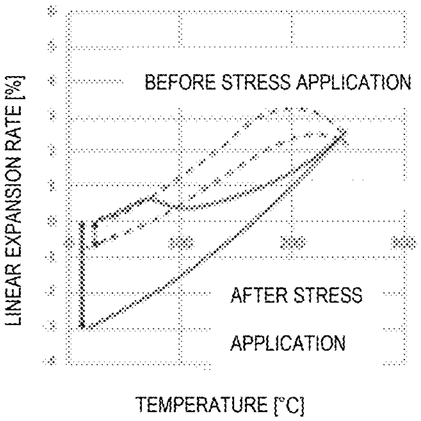
Figure 8B:
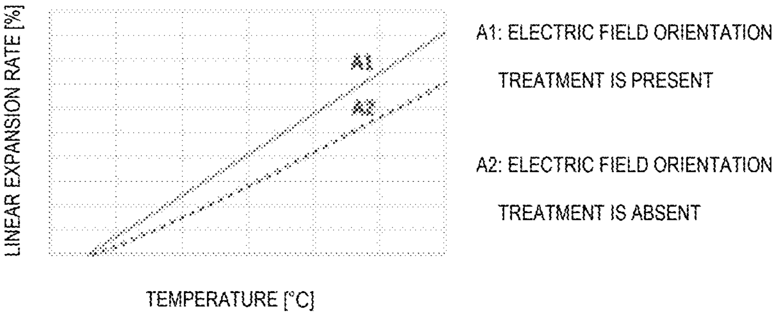

Examples of results of linear expansion rates of the elastic layer and the surface layer of the present disclosure are shown in FIGS. 8A to 8C. In FIG. 8B, it was confirmed that the linear expansion rate in the rotation axis direction of the fixing rotator was increased by orienting and aligning the filler in the thickness direction by performing electric field orientation treatment on the elastic layer. It was confirmed that the same tendency was observed in the circumferential direction. In addition, for the surface layer in FIG. 8C, heat treatment and cooling rate were controlled on the elastic layer having a large linear expansion rate in the rotation axis direction and the circumferential direction of the fixing rotator, and thus a crystal portion was formed in a state in which stress was three-dimensionally applied in the rotation axis direction and the circumferential direction of the fixing rotator, and by controlling the cooling rate, the crystal portion was further increased, and the internal stress B in the rotation axis direction of the fixing rotator was decreased.

(3-4) Method of Measuring Endothermic Quantity of Surface Layer

First, the surface layer was isolated from the fixing rotator. Specifically, the surface layer was peeled off from the substrate together with the elastic layer, and only the surface layer was isolated by dissolving the elastic layer bonded to the surface layer with a solvent.

The endothermic peak temperature and the endothermic quantity were measured using a differential scanning calorimeter (trade name: Q2000, manufactured by TA Instruments). The melting points of indium and zinc were used for temperature correction of the apparatus detection unit, and the heat of fusion of indium was used for correction of the heat quantity. Specifically, 4 mg of the surface layer was precisely weighed, placed in an aluminum pan, and measured at a temperature raising rate of 20 °C/min in a measurement range of from 25 °C to 400 °C using an empty aluminum pan as a reference. The temperature was once raised to 400 °C, held for 5 minutes, and then lowered to 25 °C at a temperature lowering rate of 20 °C/min. In the temperature raising process, the area surrounded by the temperature-endothermic quantity curve including the endothermic peak and the baseline was defined as the endothermic quantity.

The linear expansion rate, the linear expansion coefficient, and the endothermic quantity of the surface layer are average values measured by selecting five or more points of the surface layer at equal intervals in the circumferential direction from the belt central portion. Similarly, the linear expansion rate and the linear expansion coefficient of the elastic layer are average values measured by selecting five or more points at equal intervals in the circumferential direction from the belt central portion of the elastic layer.

(4) Evaluation of Actual Apparatus (Sheet Passage Wrinkling Durability and Gloss Unevenness)

Evaluation Method

Next, a method of evaluation in the present example will be described.

Evaluation 1: Sheet Passing Wrinkling Durability

Evaluation was performed using the thermal fixing device shown in FIG. 2 using the manufactured fixing rotator. The evaluation conditions are as follows.

Test environment; room temperature of 23 °C, humidity of 50% process speed; 200 mm/sec print speed; 30 sheets/min.

Sheet passage condition; a grid image was formed on GF-C081 (manufactured by Nippon Paper Group, Inc. Corporation, 81 g paper, A4 size) and sheets are continuously fed.

Mondi Color Copy (manufactured by Mondi Inc., 250 g paper, SRA3 size) was passed every 100,000 sheets, the presence or absence of the occurrence of scratches caused by wrinkling of the fixing rotator was visually confirmed at the end of the sheet passage area of the A4 sheet, a case where scratches were confirmed was taken as the durable life, and evaluation was performed according to the following evaluation criteria.

Evaluation Criteria

Rank A: no scratches due to wrinkling are generated in 400,000 sheets.

Rank B: scratches due to wrinkling are generated in 400,000 sheets.

Rank C: scratches due to wrinkling are generated in 300,000 sheets.

Rank D: scratches due to wrinkling are generated up to 200,000 sheets.

Evaluation 2: Gloss Unevenness Evaluation

Evaluation was performed using the thermal fixing device shown in FIG. 2 using the manufactured fixing rotator. Evaluation conditions are as follows.

Test environments; room temperature of 25 °C, humidity of 50% process speed; 200 mm/sec print speed; 30 sheets/min.

Sheet passage condition; a 100 mm×100 mm image was formed with 0.4 mg/cm$^3$ of black toner on Vitality (manufactured by Xerox Corporation, 75 g paper, A4 size), and the level of gloss unevenness was visually confirmed and evaluated according to the following evaluation criteria.

Evaluation Criteria

A: toner image gloss unevenness due to sheet unevenness is difficult to be seen.

B: toner image gloss unevenness due to sheet unevenness is slightly visible.

C: toner image gloss unevenness due to sheet unevenness is noticeable.

D: toner image gloss unevenness due to sheet unevenness is particularly noticeable.

In the following examples and comparative examples, an elastic layer prepared in the same manner as the elastic layer 1 of Example 1 except that the filler type, the filler addition amount, and the electric field orientation treatment time were set as described in Table 1 was used in the combinations shown in Table 2.

The linear expansion coefficients of the elastic layers 1 to 4 in the rotation axis direction and the circumferential direction of the fixing rotator and the results of orientation alignment state of the filler are shown in Table 1.

Hereinafter, the "longitudinal direction" in the tables means the rotation axis direction of the fixing rotator.

TABLE 1

| Sample | Filler type | Filler addition amount [parts by mass] | Electric field orientation treatment time (s) | Linear expansion coefficient in longitudinal direction (%/°C) | Linear expansion coefficient in circumferential direction (%/°C) | Area ratio (%) | f | Φ (°) |
|---|---|---|---|---|---|---|---|---|
| Elastic layer 1 | Metal silicon | 160 | 0 | 0.0100 | 0.0080 | 50 | 0.05 | 30 |
| Elastic layer 2 | Metal silicon | 124.8 | 30 | 0.0145 | 0.0145 | 39 | 0.20 | 33 |
| Elastic layer 3 | Metal silicon | 128 | 160 | 0.0170 | 0.0170 | 40 | 0.30 | 40 |
| Elastic layer 4 | h-BN | 96 | 160 | 0.0250 | 0.0250 | 30 | 0.40 | 45 |

In Table 1, h-BN represents boron nitride.

In Examples 2 to 11 and Comparative Examples 2 to 4, a fixing rotator was produced in the same manner as in Example 1 except that the surface layer type, the stress application method, the first-stage annealing treatment temperature, and the second-stage annealing treatment temperature (described as "–" when the second-stage annealing treatment is not performed) were changed as shown in Table 2.

As a method of applying the internal stress to the surface layer, thermal expansion of the underlying elastic layer at the time of the first-stage annealing treatment may be used without performing fixed drawing application in Example 1 as described above. Stress was applied using the elastic layer and the surface layer described in Table 2. For pulling amounts in the rotation axis direction and the circumferential direction of the fixing rotator, when fixed drawing application was used, stress was applied by pulling by the values shown in Table 2 with respect to the entire length in the rotation axis direction or the entire circumferential length of the fixing rotator of PFA before being applied by the apparatus. When thermal expansion of the underlying elastic layer was used, the pulling amount, which is described in Table 2, was calculated by the following formula using the linear expansion coefficient described in Table 1 and the first-stage annealing treatment temperature described in Table 2.

$$(\text{Pulling amount in rotation axis direction}) = (\text{linear expansion coefficient in rotation axis direction}) \times ((\text{temperature during first-stage annealing treatment}) - 25\ ^\circ\text{C})$$

$$(\text{Pulling amount in circumferential direction}) = (\text{linear expansion coefficient in circumferential direction}) \times ((\text{temperature during first-stage annealing treatment}) - 25\ ^\circ\text{C})$$

Comparative Example 1

As described in Table 2, using AP-231SH (trade name, manufactured by Daikin Industries, Ltd.) and the elastic layer 2, a fixing belt was produced in the same manner as in Example 1 until (2) production of the fixing belt ((3) without performing the process of applying stress to the surface layer, applying stress, and melting the fluororesin tube).

TABLE 2

| | Stress application method | Surface layer type | Elastic layer | Pulling amount in longitudinal direction | Pulling amount in circumferential direction | 1st-stage annealing temperature [°C] | 2nd-stage annealing temperature [°C] |
|---|---|---|---|---|---|---|---|
| Example 1 | Fixed drawing application | AP231SH | Elastic layer 1 | 4.0% | 4.0% | 320 | — |
| Example 2 | Fixed drawing application | AP231SH | Elastic layer 1 | 5.0% | 5.0% | 320 | — |
| Example 3 | Fixed drawing application | AP231SH | Elastic layer 1 | 7.5% | 5.0% | 320 | — |
| Example 4 | Fixed drawing application | AP231SH | Elastic layer 1 | 5.0% | 5.0% | 330 | — |
| Example 5 | Fixed drawing application | 451HPJ | Elastic layer 1 | 5.0% | 5.0% | 340 | — |
| Example 6 | Fixed drawing application | AP231SH | Elastic layer 1 | 5.0% | 5.0% | 340 | 290 |
| Example 7 | Elastic layer expansion | AP231SH | Elastic layer 3 | 5.0% | 5.0% | 320 | — |
| Example 8 | Elastic layer expansion | AP231SH | Elastic layer 3 | 5.0% | 5.0% | 320 | — |
| Example 9 | Elastic layer expansion | AP231SH | Elastic layer 3 | 5.0% | 5.0% | 320 | 290 |
| Example 10 | Elastic layer expansion | AP231SH | Elastic layer 3 | 5.0% | 5.0% | 320 | 290 |
| Example 11 | Elastic layer expansion | AP231SH | Elastic layer 4 | 7.4% | 7.4% | 320 | 290 |
| Comparative Example 1 | None | AP231SH | Elastic layer 2 | — | — | — | — |

TABLE 2-continued

| | Stress application method | Surface layer type | Elastic layer | Pulling amount in longitudinal direction | Pulling amount in circumferential direction | 1st-stage annealing temperature [°C] | 2nd-stage annealing temperature [°C] |
|---|---|---|---|---|---|---|---|
| Comparative Example 2 | Fixed drawing application | AP231SH | Elastic layer 2 | 3.0% | 3.0% | 290 | — |
| Comparative Example 3 | Elastic layer expansion | 451HPJ | Elastic layer 1 | 3.6% | 2.8% | 380 | — |
| Comparative Example 4 | Elastic layer expansion | AP231SH | Elastic layer 1 | 3.0% | 2.4% | 320 | — |

Table 3 summarizes these evaluation results.

TABLE 3

| | Heat of fusion of DSC [J/g] | Number of peaks of DSC | Internal stress in longitudinal direction | Wrinkle evaluation | Gloss unevenness |
|---|---|---|---|---|---|
| Example 1 | 20 | 1 | −3.0 | C | B |
| Example 2 | 20 | 1 | −5.0 | A | B |
| Example 3 | 20 | 1 | −6.0 | B | B |
| Example 4 | 21 | 1 | −4.0 | A | B |
| Example 5 | 26 | 1 | −4.0 | A | C |
| Example 6 | 20 | 2 | −5.0 | A | A |
| Example 7 | 20 | 1 | −4.0 | A | B |
| Example 8 | 20 | 1 | −4.0 | A | B |
| Example 9 | 21 | 2 | −5.0 | A | A |
| Example 10 | 26 | 2 | −5.0 | A | B |
| Example 11 | 26 | 2 | −6.0 | B | B |
| Comparative Example 1 | 17 | 1 | −2.8 | D | A |
| Comparative Example 2 | 20 | 1 | −2.6 | D | A |
| Comparative Example 3 | 26 | 1 | −2.8 | D | C |
| Comparative Example 4 | 20 | 1 | −2.6 | D | A |

As shown in the present Examples, the fixing rotator according to the present disclosure can achieve both curbing of wrinkling and curbing of gloss unevenness.

According to at least one aspect of the present disclosure, it is possible to obtain a fixing rotator capable of curbing the occurrence of wrinkling and gloss unevenness even when used for a long period of time.

According to at least one aspect of the present disclosure, it is possible to obtain a thermal fixing device including the fixing rotator.

According to at least one aspect of the present disclosure, it is possible to obtain an electrophotographic image forming apparatus including the thermal fixing device.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-085643, filed May 27, 2024, which is hereby incorporated by reference herein in its entirety.

What is claimed is:

1. A fixing rotator, comprising:

an endless shaped base layer;

an elastic layer at an outer peripheral surface side of the base layer; and a surface layer fixed to an outer peripheral surface side of the elastic layer via an adhesive layer, wherein when a length L1s of a measurement sample sampled from the surface layer in a rotation axis direction of the fixing rotator at 25 °C is measured, and a length L2s of the measurement sample when a temperature is raised from a temperature of 25 °C to 250 °C at a temperature raising rate of 10 °C/min, then held for 5 minutes while the measurement sample is pulled in the rotation axis direction of the fixing rotator with a load of 25 mN, and subsequently the temperature is lowered from the temperature of 250 °C to 25 °C at a temperature lowering rate of 10 °C/min is measured, an internal stress B represented by formula (i) below is not more than −3.0:

$$B(\%) = (L2s - L1s)/L1s \times 100. \qquad \text{(i)}$$

2. The fixing rotator according to claim 1, wherein the elastic layer comprises silicone rubber, and the surface layer comprises a fluorine resin.

3. The fixing rotator according to claim 1, wherein an endothermic quantity in a temperature raising process when calorimetry is performed by heating the measurement sample sampled from the surface layer from a temperature of 25 °C to a temperature of 400 °C at a temperature raising rate of 20 °C/min by using a differential scanning calorimeter (DSC) is at least 21 J/g.

4. The fixing rotator according to claim 1, wherein, when the measurement sample sampled from the surface layer has been subjected to calorimetry in which processes (1) and (2) below are sequentially performed using a differential scanning calorimeter (DSC), at least two endothermic peaks are present in a first DSC chart obtained in the process (1):

Process (1): a temperature raising process of heating the measurement sample from a temperature of 25 °C to a temperature of 400 °C at a temperature raising rate of 20 °C/min;

Process (2): a temperature lowering process of cooling the measurement sample heated to the temperature of 400 °C in the process (1) to a temperature of 25 °C at a temperature lowering rate of 20 °C/min.

5. The fixing rotator according to claim 1, wherein the internal stress B is at least −5.0%.

6. The fixing rotator according to claim 1, wherein when a length L1e of a measurement sample sampled from the elastic layer in the rotation axis direction of the fixing rotator at 100 °C in a temperature raising process is measured, and a length L2e at 200 °C in a temperature lowering process when the temperature is raised from a temperature of 25 °C to 250 °C at a temperature raising rate of 10 °C/min and then held for 5 minutes while the measurement sample is pulled in the rotation axis direction of the fixing rotator with a load of 25 mN, and subsequently the temperature is lowered from the temperature of 250 °C to 25 °C at a temperature lowering rate of 10 °C/min is measured, a linear expansion coefficient A of the fixing rotator in the rotation axis direction, represented by formula (ii) below, is at least 0.0175%/° C:

$$A(\%, °C) = (L2e - L1e)/L1e \times 100/(200 - 100), \quad (ii)$$

and wherein when a length L3e of the measurement sample at 100 °C in a circumferential direction is measured, and a length L4e at 200 °C in a temperature lowering process when the temperature is raised from a temperature of 25 °C to 250 °C at a temperature raising rate of 10 °C/min and then held for 5 minutes while the measurement sample is pulled in the circumferential direction with a load of 25 mN, and subsequently the temperature is lowered from the temperature of 250 °C to 25 °C at a temperature lowering rate of 10 °C/min is measured, a linear expansion coefficient A2 in the circumferential direction, represented by formula (iii) below, is at least 0.0175%/° C:

$$A2(\%/°C) = (L4e - L3e)/L3e \times 100/(200 - 100). \quad (iii)$$

7. The fixing rotator according to claim 1, wherein the elastic layer comprises rubber and thermally conductive filler dispersed in the rubber, in a total of ten binarized images of a first binarized image having a size of 150 μm×100 μm at five locations of a first cross section of the elastic layer in a thickness-circumferential direction and a second binarized image having a size of 150 μm×100 μm at five locations of a second cross section of the elastic layer in a thickness-rotation axis direction, an average value of area ratios of the thermally conductive filler is 27 to 45%, an average alignment degree F. of the thermally conductive filler is 0.10 to 0.50, and an average alignment angle Φ of the thermally conductive filler is 28 to 90°.

8. The fixing rotator according to claim 1, wherein the base layer comprises at least one selected from the group consisting of nickel, copper, iron, and aluminum.

9. A thermal fixing device, comprising a heating member and a pressure member disposed facing the heating member, wherein at least one of the heating member and the pressure member is a fixing rotator, the fixing rotator comprises:

an endless shaped base layer;

an elastic layer at an outer peripheral surface side of the base layer; and a surface layer fixed to an outer peripheral surface side of the elastic layer via an adhesive layer, wherein when a length L1s of a measurement sample sampled from the surface layer in a rotation axis direction of the fixing rotator at 25 °C is measured, and a length L2s of the measurement sample when a temperature is raised from a temperature of 25 °C to 250 °C at a temperature raising rate of 10 °C/min, then held for 5 minutes while the measurement sample is pulled in the rotation axis direction of the fixing rotator with a load of 25 mN, and subsequently the temperature is lowered from the temperature of 250 °C to 25 °C at a temperature lowering rate of 10 °C/min is measured, an internal stress B represented by formula (i) below is not more than −3.0:

$$B(\%) = (L2s - L1s)/L1s \times 100. \quad (i)$$

10. An electrophotographic image forming apparatus comprising a thermal fixing device, wherein the thermal fixing device comprises a heating member and a pressure member disposed facing the heating member, at least one of the heating member and the pressure member is a fixing rotator, the fixing rotator comprises:

an endless shaped base layer;

an elastic layer at an outer peripheral surface side of the base layer; and a surface layer fixed to an outer peripheral surface side of the elastic layer via an adhesive layer, wherein when a length L1s of a measurement sample sampled from the surface layer in a rotation axis direction of the fixing rotator at 25 °C is measured, and a length L2s of the measurement sample when a temperature is raised from a temperature of 25 °C to 250 °C at a temperature raising rate of 10 °C/min, then held for 5 minutes while the measurement sample is pulled in the rotation axis direction of the fixing rotator with a load of 25 mN, and subsequently the temperature is lowered from the temperature of 250 °C to 25 °C at a temperature lowering rate of 10 °C/min is measured, an internal stress B represented by formula (i) below is not more than −3.0:

$$B(\%) = (L2s - L1s)/L1s \times 100. \quad (i)$$

* * * * *